United States Patent
Suzuki et al.

(10) Patent No.: US 10,039,089 B2
(45) Date of Patent: Jul. 31, 2018

(54) TERMINAL DEVICE, BASE STATION APPARATUS, INTEGRATED CIRCUIT, AND COMMUNICATION METHOD

(71) Applicant: Sharp Kabushiki Kaisha, Osaka-shi, Osaka (JP)

(72) Inventors: Shoichi Suzuki, Osaka (JP); Kimihiko Imamura, Osaka (JP); Tatsushi Aiba, Osaka (JP); Kazunari Yokomakura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 7 days.

(21) Appl. No.: 15/039,060

(22) PCT Filed: Nov. 18, 2014

(86) PCT No.: PCT/JP2014/080457
§ 371 (c)(1),
(2) Date: May 25, 2016

(87) PCT Pub. No.: WO2015/079971
PCT Pub. Date: Jun. 4, 2015

(65) Prior Publication Data
US 2017/0041904 A1    Feb. 9, 2017

(30) Foreign Application Priority Data
Nov. 29, 2013   (JP) .................. 2013-246997

(51) Int. Cl.
*H04W 72/04* (2009.01)
*H04J 11/00* (2006.01)
(Continued)

(52) U.S. Cl.
CPC .......... *H04W 72/042* (2013.01); *H04J 11/00* (2013.01); *H04L 5/00* (2013.01); *H04L 5/0053* (2013.01);
(Continued)

(58) Field of Classification Search
CPC ........... H04W 72/042; H04W 72/1268; H04W 72/046; H04W 72/14; H04J 11/00;
(Continued)

(56) References Cited

U.S. PATENT DOCUMENTS

| | | | |
|---|---|---|---|
| 2013/0051355 A1* | 2/2013 | Hong ................... | H04J 11/0073 370/329 |
| 2013/0114562 A1* | 5/2013 | Seo ..................... | H04W 52/146 370/329 |

(Continued)

FOREIGN PATENT DOCUMENTS

WO    2013/170426 A1    11/2013

OTHER PUBLICATIONS

Intel Corporation, "Discussion on signaling mechanism for TDD UL-DL reconfiguration", 3GPP TSG-RAN WG1 #74bis, R1-134123, Oct. 7-11, 2013, pp. 1-6.
(Continued)

*Primary Examiner* — Phong La
(74) *Attorney, Agent, or Firm* — Keating & Bennett, LLP

(57) ABSTRACT

A reception unit is included that receives pieces of information for a cell group, which include information indicating an RNTI and information indicating a subframe for monitoring a physical downlink control channel with the RNTI, receives pieces of information for each of multiple cells in the cell group, which include information for determining an index of information indicating an UL-DL configuration for each of the multiple cells in the cell group, and monitors the PDCCH that is accompanied by the RNTI, on
(Continued)

a common search space of one cell in the cell group, on the subframe for monitoring the PDCCH with the RNTI. The information indicating the UL-DL configuration for each of the multiple cells in the cell group is transmitted on the PDCCH with the RNTI.

4 Claims, 26 Drawing Sheets

(51) Int. Cl.
    *H04L 5/00*     (2006.01)
    *H04L 5/14*     (2006.01)
    *H04W 72/12*     (2009.01)
    *H04W 72/14*     (2009.01)

(52) U.S. Cl.
    CPC .......... *H04L 5/0091* (2013.01); *H04L 5/1469* (2013.01); *H04W 72/0446* (2013.01); *H04W 72/1268* (2013.01); *H04W 72/14* (2013.01)

(58) Field of Classification Search
    CPC ....... H04L 5/00; H04L 5/0053; H04L 5/0091; H04L 5/1469
    See application file for complete search history.

(56) References Cited

U.S. PATENT DOCUMENTS

| | | | |
|---|---|---|---|
| 2013/0242824 A1* | 9/2013 | Lee | H04L 1/1819 370/281 |
| 2013/0279433 A1* | 10/2013 | Dinan | H04W 56/0005 370/329 |
| 2013/0322376 A1* | 12/2013 | Marinier | H04W 72/06 370/329 |
| 2013/0336299 A1* | 12/2013 | Lee | H04L 5/0007 370/336 |
| 2014/0016519 A1* | 1/2014 | Kim | H04W 72/1263 370/280 |
| 2014/0086173 A1* | 3/2014 | Sadeghi | H04L 5/005 370/329 |
| 2014/0119261 A1* | 5/2014 | Wang | H04W 72/04 370/312 |
| 2015/0071196 A1* | 3/2015 | Park | H04L 5/0048 370/329 |
| 2015/0092690 A1* | 4/2015 | Seo | H04W 72/042 370/329 |
| 2015/0146604 A1* | 5/2015 | Kim | H04W 4/06 370/312 |
| 2015/0180625 A1* | 6/2015 | Park | H04W 72/04 370/329 |
| 2015/0189642 A1* | 7/2015 | Yang | H04W 76/023 370/311 |
| 2015/0215906 A1* | 7/2015 | Park | H04W 72/12 370/312 |
| 2015/0245344 A1* | 8/2015 | You | H04J 11/00 370/280 |
| 2015/0249974 A1* | 9/2015 | Lee | H04W 72/042 370/329 |
| 2015/0256316 A1* | 9/2015 | Seo | H04L 1/1861 370/329 |
| 2015/0257173 A1* | 9/2015 | You | H04L 1/1864 370/330 |
| 2015/0304995 A1* | 10/2015 | Yi | H04L 5/001 370/329 |
| 2015/0341923 A1* | 11/2015 | Yang | H04W 52/146 370/329 |
| 2016/0127952 A1* | 5/2016 | You | H04W 4/005 370/252 |
| 2016/0135194 A1* | 5/2016 | Kim | H04L 1/0038 370/329 |
| 2016/0165640 A1* | 6/2016 | Yang | H04W 4/005 370/336 |
| 2016/0234860 A1* | 8/2016 | Shimezawa | H04L 1/0026 |
| 2016/0255593 A1* | 9/2016 | Blankenship | H04W 52/146 370/328 |
| 2017/0238323 A1* | 8/2017 | Marinier | H04W 72/06 |

OTHER PUBLICATIONS

Ericsson et al., "On standardization impact of TDD UL-DL adaptation", 3GPP TSG-RAN WG1 #69, R1-122016, May 21-25, 2012, pp. 1-3.

Ericsson et al., "Signalling support for dynamic TDD", 3GPP TSG-RAN WG1 #72, R1-130558, Jan. 28-Feb. 1, 2013, 3 pages.

* cited by examiner

FIG. 7

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (UL-DL CONFIGURATION FOR PRIMARY CELL, UL-DL CONFIGURATION FOR SECONDARY CELL) | SECOND UL REFERENCE UL-DL CONFIGURATION FOR SECONDARY CELL |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (UL-DL CONFIGURATION FOR PRIMARY CELL, UL-DL CONFIGURATION FOR SECONDARY CELL) | SECONDARY CELL SECOND DOWNLINK REFERENCE UL-DL CONFIGURATION |
|---|---|---|
| SET 1 | (0,0) | 0 |
|  | (1,0),(1,1),(1,6) | 1 |
|  | (2,0),(2,2),(2,1),(2,6) | 2 |
|  | (3,0),(3,3),(3,6) | 3 |
|  | (4,0),(4,1),(4,3),(4,4),(4,6) | 4 |
|  | (5,0),(5,1),(5,2),(5,3),(5,4),(5,5),(5,6) | 5 |
|  | (6,0),(6,6) | 6 |
| SET 2 | (0,1),(6,1) | 1 |
|  | (0,2),(1,2),(6,2) | 2 |
|  | (0,3),(6,3) | 3 |
|  | (0,4),(1,4),(3,4),(6,4) | 4 |
|  | (0,5),(1,5),(2,5),(3,5),(4,5),(6,5) | 5 |
|  | (0,6) | 6 |
| SET 3 | (3,1),(1,3) | 4 |
|  | (3,2),(4,2),(2,3),(2,4) | 5 |
| SET 4 | (0,1),(02),(0,3),(0,4),(0,5),(0,6) | 0 |
|  | (1,2),(1,4),(1,5) | 1 |
|  | (2,5) | 2 |
|  | (3,4),(3,5) | 3 |
|  | (4,5) | 4 |
|  | (6,1),(6,2),(6,3),(6,4),(6,5) | 6 |
| SET 5 | (1,3) | 1 |
|  | (2,3),(2,4) | 2 |
|  | (3,1),(3,2) | 3 |
|  | (4,2) | 4 |

FIG. 13

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 7 | 6 |
| 2 | | | 6 | | | | | 6 | 6 | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | \\ SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 4 | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| TERMINAL DEVICE | TDD-RNTI (16 bit) | ServCellIndex | tddconfig-index |
|---|---|---|---|
| 1A | 1000000000000000 | 0 | 2 |
|  |  | 1 | 4 |
| 1B | 1000000000000000 | 0 | 2 |
|  |  | 1 | 3 |
|  |  | 2 | 4 |

FIG. 18

| Cofiguration Index I | Periodicity T (ms) | Offset k (ms) (0 ≤ k < 7) | Valid duration |
|---|---|---|---|
| 0 | 10 | {0} | Current subframes |
| 1 | 10 | {1} | Current subframes |
| 2 | 10 | {5} | Next subframes |
| 3 | 10 | {6} | Next subframes |
| 4 | 10 | {0, 1} | Current subframes |
| 5 | 10 | {0, 5} | Next subframes |
| 6 | 10 | {1, 6} | Next subframes |
| 7 | 10 | {5, 6} | Next subframes |
| 8 | 10 | {0, 1, 5, 6} | Next subframes |
| 9 | 20 | {0} | Current subframes |
| 10 | 20 | {1} | Current subframes |
| 11 | 20 | {5} | Next subframes |
| 12 | 20 | {6} | Next subframes |
| 13 | 20 | {0, 1} | Current subframes |
| 14 | 20 | {0, 5} | Next subframes |
| 15 | 20 | {1, 6} | Next subframes |
| 16 | 20 | {5, 6} | Next subframes |
| 17 | 20 | {10} | Next subframes |
| 18 | 20 | {11} | Next subframes |
| 19 | 20 | {15} | Next subframes |
| 20 | 20 | {16} | Next subframes |
| 21 | 20 | {10, 11} | Next subframes |
| 22 | 20 | {10, 15} | Next subframes |
| 23 | 20 | {11, 16} | Next subframes |
| 24 | 20 | {15, 16} | Next subframes |
| 25 | 20 | {0, 10} | Next subframes |
| 26 | 20 | {1, 11} | Next subframes |
| 27 | 20 | {5, 15} | Next subframes |
| 28 | 20 | {6, 16} | Next subframes |
| 29 | 20 | {0, 1, 5, 6, 10, 11, 15, 16} | Next subframes |

FIG. 19

| Cofiguration Index *I* | Periodicity *T* (ms) | Offset k (ms) (0 ≤ k < 7) | Valid duration |
|---|---|---|---|
| 30 | 40 | {0} | Current subframes |
| 31 | 40 | {1} | Current subframes |
| 32 | 40 | {5} | Next subframes |
| 33 | 40 | {6} | Next subframes |
| 34 | 40 | {0, 1} | Current subframes |
| 35 | 40 | {0, 5} | Next subframes |
| 36 | 40 | {1, 6} | Next subframes |
| 37 | 40 | {5, 6} | Next subframes |
| 38 | 40 | {10} | Next subframes |
| 39 | 40 | {11} | Next subframes |
| 40 | 40 | {15} | Next subframes |
| 41 | 40 | {16} | Next subframes |
| 42 | 40 | {10, 11} | Next subframes |
| 43 | 40 | {10, 15} | Next subframes |
| 44 | 40 | {11, 16} | Next subframes |
| 45 | 40 | {15, 16} | Next subframes |
| 46 | 40 | {20} | Next subframes |
| 47 | 40 | {21} | Next subframes |
| 48 | 40 | {25} | Next subframes |
| 49 | 40 | {26} | Next subframes |
| 50 | 40 | {20, 21} | Next subframes |
| 51 | 40 | {20, 25} | Next subframes |
| 52 | 40 | {21, 26} | Next subframes |
| 53 | 40 | {25, 26} | Next subframes |
| 54 | 40 | {30} | Next subframes |
| 55 | 40 | {31} | Next subframes |
| 56 | 40 | {35} | Next subframes |
| 57 | 40 | {36} | Next subframes |
| 58 | 40 | {30, 31} | Next subframes |
| 59 | 40 | {30, 35} | Next subframes |
| 60 | 40 | {31, 36} | Next subframes |
| 61 | 40 | {35, 36} | Next subframes |
| 62 | 40 | {10, 30} | Next subframes |
| 63 | 40 | {11, 31} | Next subframes |
| 64 | 40 | {15, 35} | Next subframes |
| 65 | 40 | {16, 36} | Next subframes |
| 66 | 40 | {0, 10, 20, 30} | Next subframes |
| 67 | 40 | {5, 15, 25, 35} | Next subframes |
| 68 | 40 | {6, 16, 26, 36} | Next subframes |
| 69 | 40 | {0, 1, 5, 6, 10, 11, 15, 16, 20, 21, 25, 26, 30, 31, 35, 36} | Next subframes |

FIG. 20

| Cofiguration Index $I$ | Periodicity $T$ (ms) | Offset k (ms) (0 ≤ k < 7) | Valid duration |
|---|---|---|---|
| 70 | 80 | {0} | Current subframes |
| 71 | 80 | {1} | Current subframes |
| 72 | 80 | {5} | Next subframes |
| 73 | 80 | {6} | Next subframes |
| 74 | 80 | {0, 1} | Current subframes |
| 75 | 80 | {0, 5} | Next subframes |
| 76 | 80 | {1, 6} | Next subframes |
| 77 | 80 | {5, 6} | Next subframes |
| 78 | 80 | {10} | Next subframes |
| 79 | 80 | {11} | Next subframes |
| 80 | 80 | {15} | Next subframes |
| 81 | 80 | {16} | Next subframes |
| 82 | 80 | {10, 11} | Next subframes |
| 83 | 80 | {10, 15} | Next subframes |
| 84 | 80 | {11, 16} | Next subframes |
| 85 | 80 | {15, 16} | Next subframes |
| 86 | 80 | {20} | Next subframes |
| 87 | 80 | {21} | Next subframes |
| 88 | 80 | {25} | Next subframes |
| 89 | 80 | {26} | Next subframes |
| 90 | 80 | {20, 21} | Next subframes |
| 91 | 80 | {20, 25} | Next subframes |
| 92 | 80 | {21, 26} | Next subframes |
| 93 | 80 | {25, 26} | Next subframes |
| 94 | 80 | {30} | Next subframes |
| 95 | 80 | {31} | Next subframes |
| 96 | 80 | {35} | Next subframes |
| 97 | 80 | {36} | Next subframes |
| 98 | 80 | {30, 31} | Next subframes |
| 99 | 80 | {30, 35} | Next subframes |
| 100 | 80 | {31, 36} | Next subframes |
| 101 | 80 | {35, 36} | Next subframes |
| 102 | 80 | {40} | Next subframes |
| 103 | 80 | {41} | Next subframes |
| 104 | 80 | {45} | Next subframes |
| 105 | 80 | {46} | Next subframes |
| 106 | 80 | {40, 41} | Next subframes |
| 107 | 80 | {40, 45} | Next subframes |
| 108 | 80 | {41, 46} | Next subframes |
| 109 | 80 | {45, 46} | Next subframes |

FIG. 21

| Cofiguration Index *I* | Periodicity *T* (ms) | Offset k (ms) (0 ≤ k < 7) | Valid duration |
|---|---|---|---|
| 110 | 80 | {50} | Next subframes |
| 111 | 80 | {51} | Next subframes |
| 112 | 80 | {55} | Next subframes |
| 113 | 80 | {56} | Next subframes |
| 114 | 80 | {50, 51} | Next subframes |
| 115 | 80 | {50, 55} | Next subframes |
| 116 | 80 | {51, 56} | Next subframes |
| 117 | 80 | {55, 56} | Next subframes |
| 118 | 80 | {60} | Next subframes |
| 119 | 80 | {61} | Next subframes |
| 120 | 80 | {65} | Next subframes |
| 121 | 80 | {66} | Next subframes |
| 122 | 80 | {60, 61} | Next subframes |
| 123 | 80 | {60, 65} | Next subframes |
| 124 | 80 | {61, 66} | Next subframes |
| 125 | 80 | {65, 66} | Next subframes |
| 126 | 80 | {70} | Next subframes |
| 127 | 80 | {71} | Next subframes |
| 128 | 80 | {75} | Next subframes |
| 129 | 80 | {76} | Next subframes |
| 130 | 80 | {70, 71} | Next subframes |
| 131 | 80 | {70, 75} | Next subframes |
| 132 | 80 | {71, 76} | Next subframes |
| 133 | 80 | {75, 76} | Next subframes |
| 134 | 80 | {30, 70} | Next subframes |
| 135 | 80 | {31, 71} | Next subframes |
| 136 | 80 | {35, 75} | Next subframes |
| 137 | 80 | {36, 76} | Next subframes |
| 138 | 80 | {10, 30, 50, 70} | Next subframes |
| 139 | 80 | {11, 31, 51, 71} | Next subframes |
| 140 | 80 | {15, 35, 55, 75} | Next subframes |
| 141 | 80 | {16, 36, 56, 76} | Next subframes |
| 142 | 80 | {0, 10, 20, 30, 40, 50, 60, 70} | Next subframes |
| 143 | 80 | {5, 15, 25, 35, 45, 55, 65, 75} | Next subframes |
| 144 | 80 | {6, 16, 26, 36, 46, 56, 66, 76} | Next subframes |
| 145 | 80 | {0, 1, 5, 6, 10, 11, 15, 16, 20, 21, 25, 26, 30, 31, 35, 36, 40, 41, 45, 46, 50, 51, 55, 56, 60, 61, 65, 66, 70, 71, 75, 76} | Next subframes |

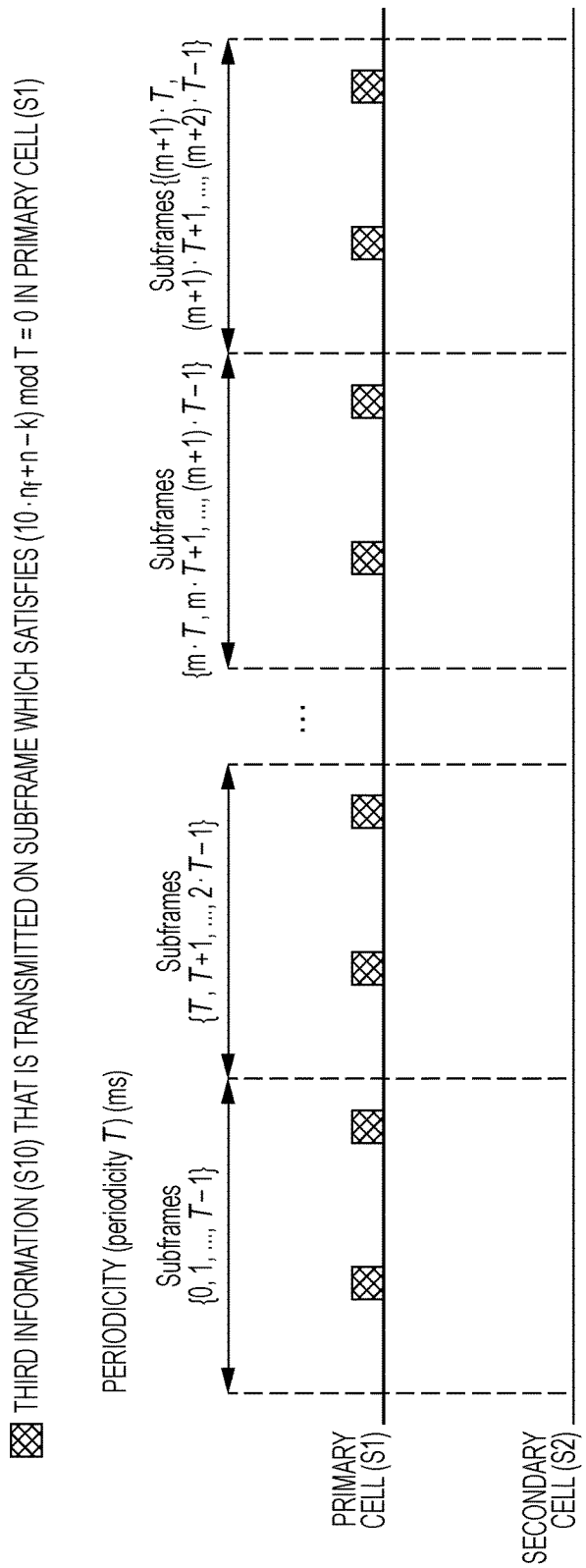

FIG. 23

| TERMINAL DEVICE | CELL GROUP INDEX | TDD-RNTI (16 bit) | ServCellIndex OF CELL THAT MONITORS THIRD INFORMATION | ServCellIndex | INDEX OF THIRD INFORMATION |
|---|---|---|---|---|---|
| 1A | 0 | 1000000000000000 | 0 | 0 | 2 |
|  |  |  |  | 1 | 4 |
| 1B | 0 | 1000000000000000 | 0 | 0 | 2 |
|  |  |  |  | 1 | 3 |
|  | 1 | 1111111100000000 | 3 | 3 | 1 |
|  |  |  |  | 4 | 2 |

TERMINAL DEVICE, BASE STATION APPARATUS, INTEGRATED CIRCUIT, AND COMMUNICATION METHOD

TECHNICAL FIELD

The present invention relates to a terminal device, a base station apparatus, an integrated circuit, and a communication method.

This application claims the benefit of Japanese Patent Application 2013-246997 filed on Nov. 29, 2013, the entire contents of which are incorporated herein by reference.

BACKGROUND ART

In the 3rd Generation Partnership Project (3GPP), a wireless access method and a wireless network for cellular mobile communication (hereinafter referred to as "Long Term Evolution (LTE)", or "Evolved Universal Terrestrial Radio Access (EUTRA)") have been considered. In LTE, a base station apparatus is also referred to as an evolved NodeB (eNodeB) and a terminal device is also referred to as User Equipment (UE). LTE is a cellular communication system in which an area is divided in a cellular pattern into multiple cells, each being served by a base station apparatus. A single base station apparatus may manage multiple cells.

LTE supports Time Division Duplex (TDD). LTE that employs a TDD scheme is also referred to as TD-LTE or LTE TDD. In TDD, an uplink signal and a downlink signal are time-multiplexed.

In the 3GPP, application of a traffic adaptation technology and an interference reduction technology (DL-UL Interference Management and Traffic Adaptation) to TD-LTE has been studied. The traffic adaptation technology is a technology that changes a ratio between an uplink resource and a downlink resource according to uplink traffic and downlink traffic. The traffic adaptation technology is also referred to as dynamic TDD.

In NPL 1, a method of using a flexible subframe is disclosed as a method of realizing traffic adaptation. The base station apparatus can perform reception of the uplink signal or transmission of the downlink signal on the flexible subframe. In NPL 1, as long as the base station apparatus does not instruct the terminal device to transmit the uplink signal on the flexible subframe, the terminal device regards the flexible subframe as the downlink subframe.

NPL 1 discloses that a Hybrid Automatic Repeat reQuest (HARQ) timing for a Physical Downlink Shared Channel (PDSCH) is determined based on an uplink-downlink configuration that is newly introduced and that an HARQ timing for a Physical Uplink Shared Channel (PUSCH) is determined based on an initial UL-DL configuration.

NPL 2 discloses that (a) a UL/DL Reference Configuration is newly introduced and (b) several subframes can be scheduled for any one of uplink and downlink by a dynamic grant/assignment from scheduling.

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21st-25th May 2012.

NPL 2: "Signalling support for dynamic TDD", R1-130558, Ericsson, ST-Ericsson, 3GPP TSG-RAN WG1 Meeting #72, St Julian's, Malta, 28th Jan.-1st Feb. 2013.

SUMMARY OF INVENTION

Technical Problem

Several aspects of the present invention are provided in view of the problems described above. An object of the invention is to provide a terminal device, a base station apparatus, an integrated circuit, and a communication method, in all of which communication can be efficiently performed.

Solution to Problem (1) In order to accomplish the object described above, the following means is contrived according to an aspect of the present invention. That is, according to a first aspect of the present invention, there is a provided a terminal device including: a reception unit that receives pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T, receives pieces of information for each of multiple cells in the cell group, which include information for determining an index of information indicating an uplink-downlink configuration for each of the multiple cells in the cell group, and monitors the physical downlink control channel with the RNTI, on a common search space of at least one cell in the cell group, on the subframe for monitoring the physical downlink control channel with the RNTI, in which the information indicating the uplink-downlink configuration for each of the multiple cells in the cell group is transmitted on the physical downlink control channel with the RNTI.

(2) Furthermore, according to the first aspect of the present invention, the reception unit may receive information indicating a cell index of one cell.

(3) Furthermore, according to the first aspect of the present invention, in a case where the physical downlink control channel with the RNTI is detected on radio frames $\{m \cdot T/10, m \cdot T/10+1, \ldots, (m+1) \cdot T/10-1\}$, the uplink-downlink configuration for radio frames $\{(m+1) \cdot T/10, (m+1) \cdot T/10+1, \ldots, (m+2) \cdot T/10-1\}$ in each of the multiple cells may be given by the information indicating the uplink-downlink configuration for each of the multiple cells.

(4) Furthermore, according to the first aspect of the present invention, the uplink-downlink configuration for the radio frames $\{(m+1) \cdot T/10, (m+1) \cdot T/10+1, \ldots, (m+2) \cdot T/10-1\}$ may be used for monitoring the physical downlink control channel with downlink control information of a format which is used for scheduling a PDSCH in one cell.

(5) Furthermore, according to the first aspect of the present invention, the periodicity T may be 20 milliseconds, 40 milliseconds, or 80 milliseconds.

(6) According to a second aspect of the present invention, there is provided a communication method for use in a terminal device, including: receiving pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T; receiving pieces of information for each of multiple cells in the cell group, which include information for determining an index of information indicating an uplink-downlink configuration for each of the multiple cells in the cell group; and monitoring the physical downlink control channel with the RNTI, on a common search space of at least one cell in the cell group, on the subframe for monitoring the physical downlink control channel with the RNTI, in which the information indicating the uplink-downlink configuration for each of the multiple cells in the cell group is transmitted on the physical downlink control channel with the RNTI.

(7) Furthermore, according to a third aspect of the present invention, there is provided an integrated circuit that is mounted into a terminal device, causing the terminal device to perform a sequence of functions including: a function of receiving pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T; a function of receiving pieces of information for each of multiple cells in the cell group, which include information for determining an index of information indicating an uplink-downlink configuration for each of the multiple cells in the cell group; and a function of monitoring the physical downlink control channel with the RNTI, on a common search space of at least one cell in the cell group, on the subframe for monitoring the physical downlink control channel with the RNTI, in which the information indicating the uplink-downlink configuration for each of the multiple cells in the cell group is transmitted on the physical downlink control channel with the RNTI.

(8) Furthermore, according to a fourth aspect of the present invention, there is provided a base station apparatus including: a transmission unit that transmits pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T, and transmits pieces of information for each of multiple cells in the cell group, which include information for determining an index of information indicating an uplink-downlink configuration for each of the multiple cells in the cell group, in which the physical downlink control channel with the RNTI is monitored on a common search space of at least one cell in the cell group, on the subframe for monitoring the physical downlink control channel with the RNTI, and in which the information indicating the uplink-downlink configuration for each of the multiple cells in the cell group is transmitted on the physical downlink control channel with the RNTI.

(9) Furthermore, according to the fourth aspect of the present invention, the transmission unit may transmit information indicating a cell index of one cell.

(10) Furthermore, according to the fourth aspect of the present invention, in a case where the physical downlink control channel with the RNTI is detected on radio frames $\{m \cdot T/10, m \cdot T/10+1, \ldots, (m+1) \cdot T/10-1\}$, the uplink-downlink configuration for radio frames $\{(m+1) \cdot T/10, (m+1) \cdot T/10+1, \ldots, (m+2) \cdot T/10-1\}$ in each of the multiple cells may be given by the information indicating the uplink-downlink configuration for each of the multiple cells.

(11) Furthermore, according to the fourth aspect of the present invention, the uplink-downlink configuration for the radio frames $\{(m+1) \cdot T/10, (m+1) \cdot T/10+1, \ldots, (m+2) \cdot T/10-1\}$ may be used for monitoring the physical downlink control channel with downlink control information of a format which is used for scheduling a PDSCH in one cell.

(12) Furthermore, according to the fourth aspect of the present invention, the periodicity T may be 20 milliseconds, 40 milliseconds, or 80 milliseconds.

(13) Furthermore, according to a fifth aspect of the present invention, there is provided a communication method for use in a base station apparatus, including: transmitting pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T; and transmitting pieces of information for each of multiple cells in the cell group, which include information for determining an index of information indicating an uplink-downlink configuration for each of the multiple cells in the cell group, in which the physical downlink control channel with the RNTI is monitored on a common search space of at least one cell in the cell group, on the subframe for monitoring the physical downlink control channel with the RNTI, and in which the information indicating the uplink-downlink configuration for each of the multiple cells in the cell group is transmitted on the physical downlink control channel with the RNTI.

(14) Furthermore, according to a sixth aspect of the present invention, there is provided an integrated circuit that is mounted into a base station apparatus, causing the base station apparatus to perform a sequence of functions including: a function of transmitting pieces of information for a cell group, which include information indicating a Radio Network Temporary Identifier (RNTI), information indicating a periodicity T for monitoring a physical downlink control channel with the RNTI, and information indicating a subframe for monitoring the physical downlink control channel with the RNTI during the periodicity T; and a function of transmitting pieces of information for each of multiple cells in the cell group, which include information for determining an index of information indicating an uplink-downlink configuration for each of the multiple cells in the cell group, in which the physical downlink control channel with the RNTI is monitored on a common search space of at least one cell in the cell group, on the subframe for monitoring the physical downlink control channel with the RNTI, and in which the information indicating the uplink-downlink configuration for each of the multiple cells in the cell group is transmitted on the physical downlink control channel with the RNTI.

Advantageous Effects of Invention

According to several aspects of the present invention, the terminal device can efficiently communicate with the base station apparatus.

BRIEF DESCRIPTION OF DRAWINGS

FIG. 7 is a table illustrating one example of a UL-DL configuration according to the present embodiment.

FIG. 10 is a diagram illustrating a correspondence between a pair that is formed by the first UL reference UL-DL configuration for a different serving cell (a primary cell) and the first UL reference UL-DL configuration for a serving cell (a secondary cell), and the second UL reference UL-DL configuration for the secondary cell, according to the present embodiment.

FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell, according to the present embodiment.

FIG. 13 is a diagram illustrating a correspondence between a subframe n to which a PDCCH/EPDCCH/PHICH is allocated and a subframe n+k to which the PUSCH to which the PDCCH/EPDCCH/PHICH described above corresponds is allocated, according to the present embodiment.

FIG. 14 is a diagram illustrating an example of a correspondence between the subframe n to which the PUSCH is allocated, and the subframe n+k to which the PHICH to which the PUSCH described above corresponds is allocated, according to the present embodiment.

FIG. 15 is a diagram illustrating a correspondence between a subframe n−k to which a PDSCH is allocated and the subframe n on which an HARQ-ACK to which the PDSCH described above corresponds is transmitted, according to the present embodiment.

FIG. 16 is a diagram illustrating one example of a configuration of a correspondence between ServCellIndex and an index of third information according to the present embodiment.

FIG. 18 is a first diagram illustrating one example of a configuration index for monitoring of the DCI format 5 including the third information according to the present embodiment.

FIG. 19 is a second diagram illustrating one example of the configuration index for the monitoring of the DCI format 5 including the third information according to the present embodiment.

FIG. 20 is a third diagram illustrating one example of the configuration index for the monitoring of the DCI format 5 including the third information according to the present embodiment.

FIG. 21 is a fourth diagram illustrating one example of the configuration index for the monitoring of the DCI format 5 including the third information according to the present embodiment.

FIG. 22 is a diagram illustrating one example of a periodicity T and an offset k according to the present embodiment.

FIG. 23 is a diagram illustrating one example of a configuration of a correspondence between a cell group index, ServCellIndex, and the index of the third information according to the present embodiment.

DESCRIPTION OF EMBODIMENTS

Embodiments of the present invention will be described below.

According to the present embodiment, plural cells are configured for a terminal device. A technology in which the terminal device performs communication through multiple cells is referred to as cell aggregation or carrier aggregation. The present invention may be applied to each of the multiple cells that are configured for the terminal device. Furthermore, the present invention may be applied to some of the multiple cells that are configured. A cell that is configured for the terminal device is also referred to as a serving cell.

Multiple serving cells that are configured include one primary cell, or one or multiple secondary cells. The primary cell is a serving cell in which an initial connection establishment procedure is executed, a serving cell in which a connection re-establishment procedure is started, or a cell that is indicated as a primary cell during a handover procedure. At a point in time at which an RRC connection is established, or later, the secondary cell may be configured.

A Time Division Duplex (TDD) scheme is applied to a wireless communication system according to the present embodiment. In the case of the cell aggregation, the TDD scheme may be applied to all multiple cells. Furthermore, in the case of the cell aggregation, a cell to which the TDD scheme is applied and a cell to which a Frequency Division Duplex (FDD) scheme is applied may be put together. In the case of the cell aggregation, the present invention can be applied to some or all of the cells.

Figure 1:
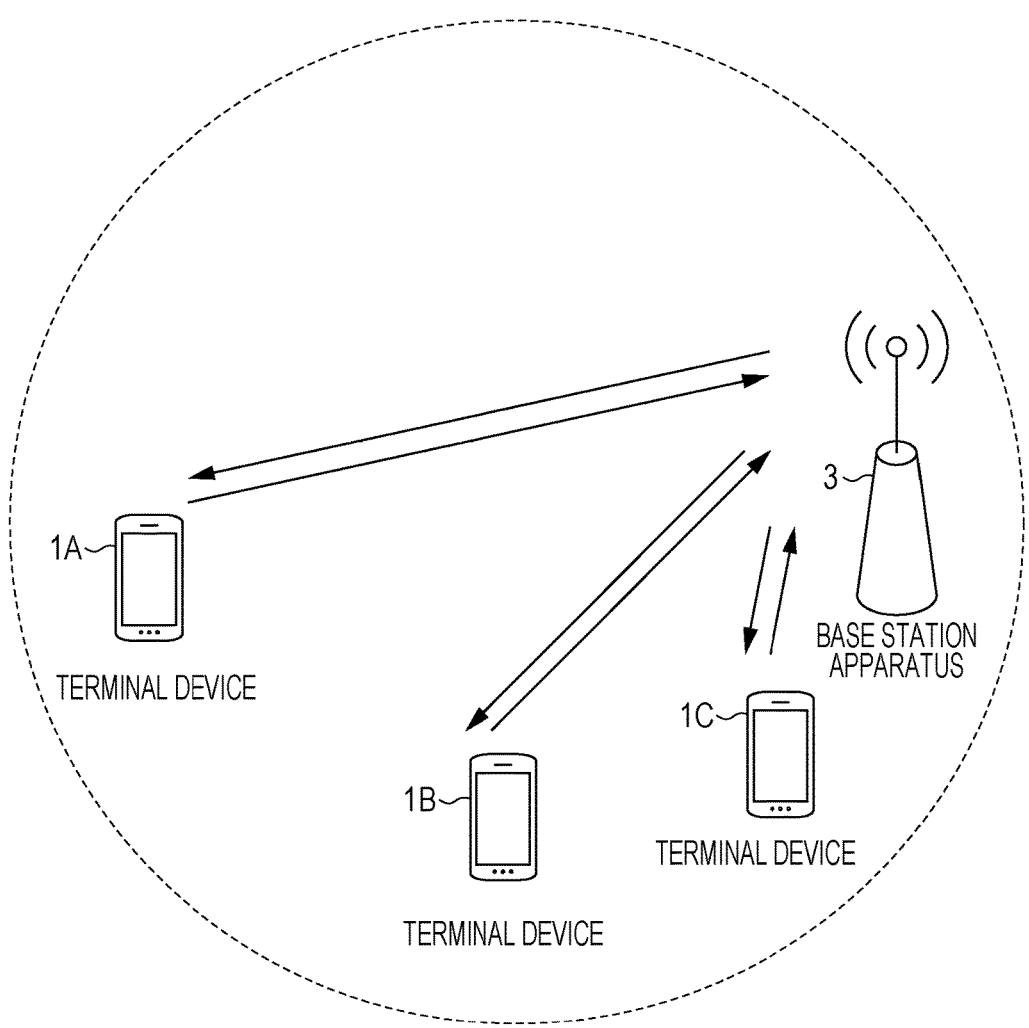
FIG. 1 is a conceptual diagram illustrating a wireless communication system according to the present embodiment.

FIG. 1 is a conceptual diagram of the wireless communication system according to the present embodiment. In FIG. 1, the wireless communication system includes terminal devices 1A to 1C and a base station apparatus 3. The terminal devices 1A to 1C are hereinafter referred to as a terminal device 1.

A physical channel and a physical signal according to the present embodiment are described.

In FIG. 1, the following uplink physical channels are used for uplink wireless communication from the terminal device 1 to the base station apparatus 3. The uplink physical channels are used for transmitting information that is output from a higher layer.

Physical Uplink Control Channel (PUCCH)
Physical Uplink Shared Channel (PUSCH)
Physical Random Access Channel (PRACH)

The PUCCH is a physical channel that is used for transmitting an Uplink Control Information (UCI). Pieces of Uplink Control Information include Channel State Information (CSI) for downlink, a Scheduling Request (SR) indicating a request for a PUSCH resource, and an acknowledgement (ACK)/negative-acknowledgement (NACK) of downlink data (a Transport block or a Downlink-Shared Channel (DL-SCH)). The ACK/NACK is also referred to as an HARQ-ACK, HARQ feedback, or response information.

The PUSCH is a physical channel that is used for transmitting uplink data (Uplink-Shared Channel (UL-SCH)). Furthermore, the PUSCH may be used for transmitting the HARQ-ACK and/or channel state information along with the uplink data. Furthermore, the PUSCH may be used for transmitting only the channel state information or for transmitting only the HARQ-ACK and the channel state information.

The PRACH is a physical channel that is used for transmitting a random access preamble. The PRACH is used for indicating the initial connection establishment procedure, the handover procedure, the connection re-establishment procedure, synchronization (timing adjustment) for uplink transmission, and the request for the PUSCH resource.

In FIG. 1, the following uplink physical signals are used for the uplink wireless communication. The uplink physical signal is not used for transmitting the information that is output from the higher layer, but is used by a physical layer.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed along with the PUSCH or the PUCCH. The base station apparatus 3 uses the DMRS in order to perform channel reconfiguration of the PUSCH or the PUCCH. Transmission of both of the PUSCH and the DMRS is hereinafter referred to simply as transmission of the PUSCH. Transmission of both of the PUCCH and the DMRS is hereinafter referred to as transmission of the PUCCH.

The SRS has no relationship with the transmission of the PUSCH or the PUCCH. The base station apparatus 3 uses the SRS to measure the uplink channel state. The terminal device 1 transmits a first SRS on a first resource that is configured by the higher layer. Additionally, in a case where information indicating a request for transmission of the SRS is received through a PDCCH, the terminal device 1 transmits a second SRS only one time on a second resource that is configured by the higher layer. The first SRS is also referred to as a periodic SRS or a type 0 trigger SRS. The second SRS is also referred to as an aperiodic SRS or a type 1 trigger SRS. Aperiodic transmission of the SRS is scheduled by the information indicating that the transmission of the SRS is requested.

In FIG. 1, the following downlink physical channels are used for downlink wireless communication from the base station apparatus 3 to the terminal device 1. The downlink physical channel is used for transmitting the information that is output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB) (Broadcast Channel (BCH)) that is in common use in the terminal device 1.

The PCFICH is used for transmitting information that indicates a region (an OFDM symbol) which is used for transmission of the PDCCH.

The PHICH is used for transmitting an HARQ indicator (HARQ feedback or response information) indicating an acknowledgement (ACK) of or a negative acknowledgement (NACK) of the uplink data (Uplink Shared Channel (UL-SCH)) that is received by the base station apparatus 3.

The PDCCH and the EPDCCH are used for transmitting Downlink Control Information (DCI). The Downlink Control Information is also referred to as a DCI format. The Downlink Control Information includes a DCI format 5, a downlink grant, and an uplink grant that are used for transmitting at least one UL-DL configuration. The downlink grant is also referred to as downlink assignment or downlink allocation.

The downlink grant includes a DCI format 1A. The downlink grant is used for scheduling of the PDSCH within a single cell. The downlink grant is used for the scheduling of the PDSCH within the same subframe as the subframe on which the downlink grant is transmitted.

The uplink grant includes a DCI format 0. The uplink grant is used for scheduling of the PUSCH within a single cell. The uplink grant is used for the scheduling of a single PUSCH within the fourth or later subframe after the subframe on which the uplink grant is transmitted.

The PDSCH is used for transmitting the downlink data (Downlink Shared Channel (DL-SCH)).

The PMCH is used for transmitting multicast data (a Multicast Channel (MCH)).

In FIG. 1, the following downlink physical signals are used for the downlink wireless communication. The downlink physical signal is not used for transmitting the information that is output from the higher layer, but is used by the physical layer.

Synchronization signal (SS)
Downlink Reference Signal (DL RS)

The synchronization signal is used in order for the terminal device 1 to be synchronized to a frequency domain and a time domain for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform the channel reconfiguration of the downlink physical channel. The downlink reference signal is used in order for the terminal device 1 to calculate the Channel State Information for downlink.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH Non-Zero Power Channel State Information-Reference Signal (NZP CSI-RS)

Zero Power Channel State Information-Reference Signal (ZP CSI-RS)

Multimedia Broadcast and Multicast Service over Single Frequency Network Reference signal (MBSFN RS)

Positioning Reference Signal (PRS)

The CRS is transmitted in an entire band for a subframe. The CRS is used for performing demodulation of the PBCH/PDCCH/PHICH/PCFICH/PDSCH. The CRS may be used in order for the terminal device 1 to calculate the Channel State Information for downlink. The PBCH/PDCCH/PHICH/PCFICH is transmitted in an antenna port that is used for transmission of the CRS.

The URS associated with the PDSCH is transmitted on a subframe and in a band. The subframe and the band are used for transmission of the PDSCH with which the URS is associated. The URS is used for performing the demodulation of the PDSCH with which the URS is associated.

The PDSCH is transmitted in an antenna port that is used for transmission of the CRS or the URS. The DCI format 1A is used for the scheduling of the PDSCH that is transmitted in the antenna port which is used for the transmission of the CRS. A DCI format 2D is used for the scheduling of the PDSCH that is transmitted in the antenna port which is used for the transmission of the URS.

The DMRS associated with the EPDCCH is transmitted on a subframe and in a band. The subframe and the band are used for transmission of the EPDCCH with which the DMRS is associated. The DMRS is used for performing demodulation of the EPDCCH with which the DMRS is associated. The EPDCCH is transmitted in an antenna port that is used for transmission of the DMRS.

The NZP CSI-RS is transmitted on a subframe that is configured. A resource on which the NZP CSI-RS is transmitted is configured by the base station apparatus. The NZP CSI-RS is used in order for the terminal device 1 to calculate the Channel State Information for downlink. The terminal device 1 performs signal measurement (channel measurement) using the NZP CSI-RS.

A resource of the ZP CSI-RS is configured by the base station apparatus 3. With a zero output, the base station apparatus 3 transmits the ZP CSI-RS. More precisely, the base station apparatus 3 does not transmit the ZP CSI-RS. The base station apparatus 3 does not transmit the PDSCH and the EPDCCH on a resource on which the ZP CSI-RS is configured. For example, in a certain cell, the terminal device 1 can measure interference on a resource to which the NZP CSI-RS corresponds.

The MBSFN RS is transmitted in an entire band for a subframe that is used for transmission of the PMCH. The MBSFN RS is used for performing demodulation of the PMCH. The PMCH is transmitted in an antenna port that is used for transmission of the MBSFN RS.

The PRS is used in order for the terminal device to measure a geographical location of the terminal device itself.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel that is used in a Medium Access Control (MAC) layer is referred to as a transport channel. A unit of the transport channel that is used in the MAC layer is also referred to as a transport block (TB) or a MAC protocol data unit (PDU). Control of a Hybrid Automatic Repeat reQuest (HARQ) is performed for every transport block in the MAC layer. The transport block is a unit of data that the MAC layer delivers to the physical layer. In the physical layer, the transport block is mapped to a codeword, and coding processing is performed on every codeword.

A configuration of the radio frame according to the present embodiment will be described below.

Figure 2:
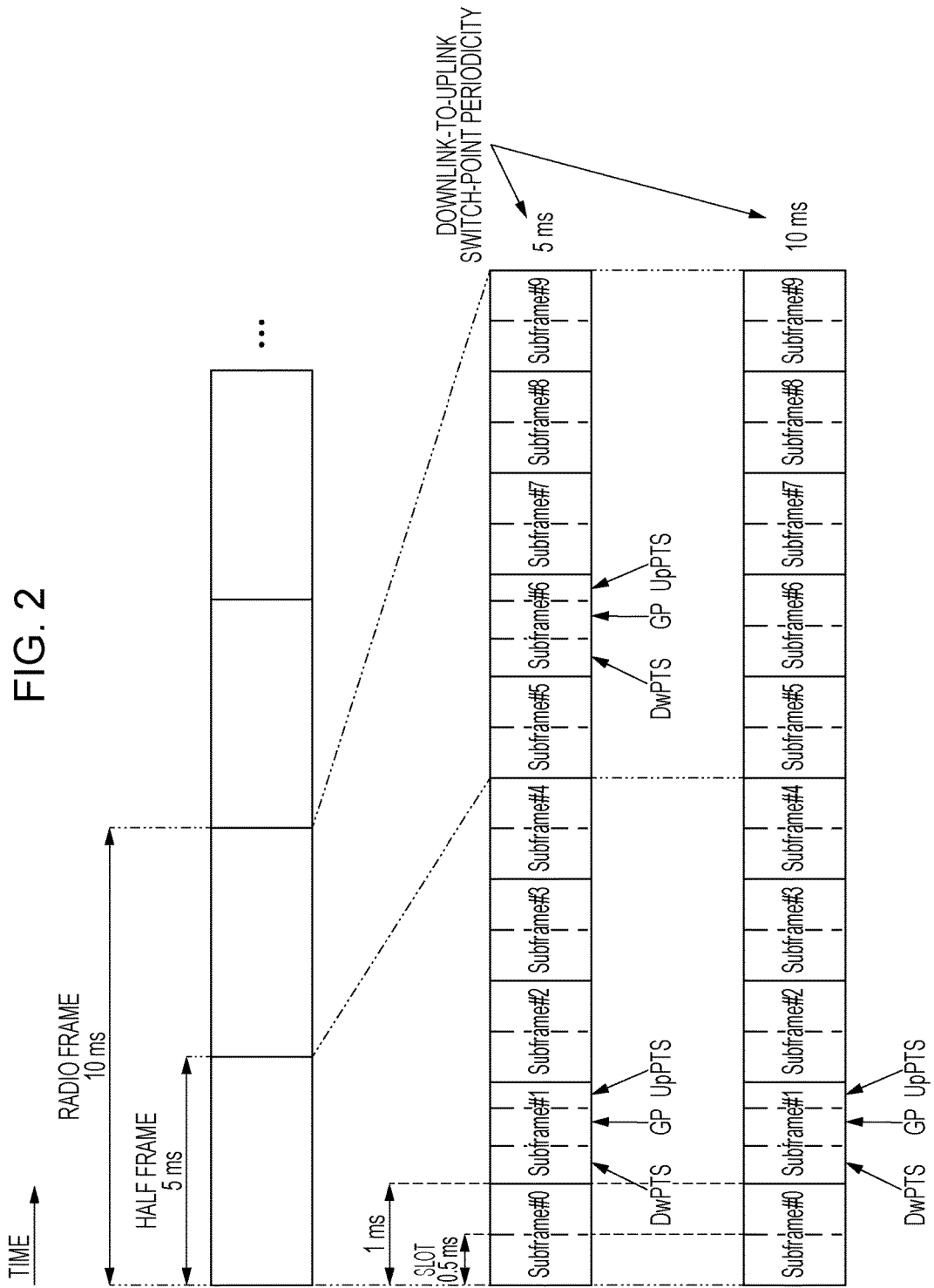
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms long. In FIG. 2, the horizontal axis is a time axis. Furthermore, radio frames are each constituted from two half frames. Half frames are each 5 ms long. The half frames are each constituted from five subframes. Subframes are each 1 ms long, and are defined by two consecutive slots. Slots are each 0.5 ms long. An i-th subframe within a radio frame is constituted from a (2×i)-th slot and a (2×i+1)-th slot. More precisely, ten subframes can be used at intervals of 10 ms.

According to the present embodiment, the following three types of subframes are defined.

Downlink subframe (first subframe)
Uplink subframe (second subframe)
Special subframe (third subframe)

The downlink subframe is a subframe reserved for downlink transmission. The uplink subframe is a subframe that is reserved for the uplink transmission. The special subframe is constituted from three fields. The three fields are a Downlink Pilot Time Slot (DwPTS), a Guard Period (GP), and an Uplink Pilot Time Slot (UpPTS). A sum of lengths of the DwPTS, the GP, and the UpPTS is 1 ms long. The DwPTS is a field reserved for the downlink transmission. The UpPTS is a field reserved for the uplink transmission. The GP is a field, the downlink transmission and the uplink transmission on which are not performed. Moreover, the special subframe may be constituted only from the DwPTS and the GP, and may be constituted only from the GP and the UpPTS.

A single radio frame is configured at least from the downlink subframe, the uplink subframe, and the special subframe.

A configuration of a slot according to the present embodiment will be described below.

Figure 3:
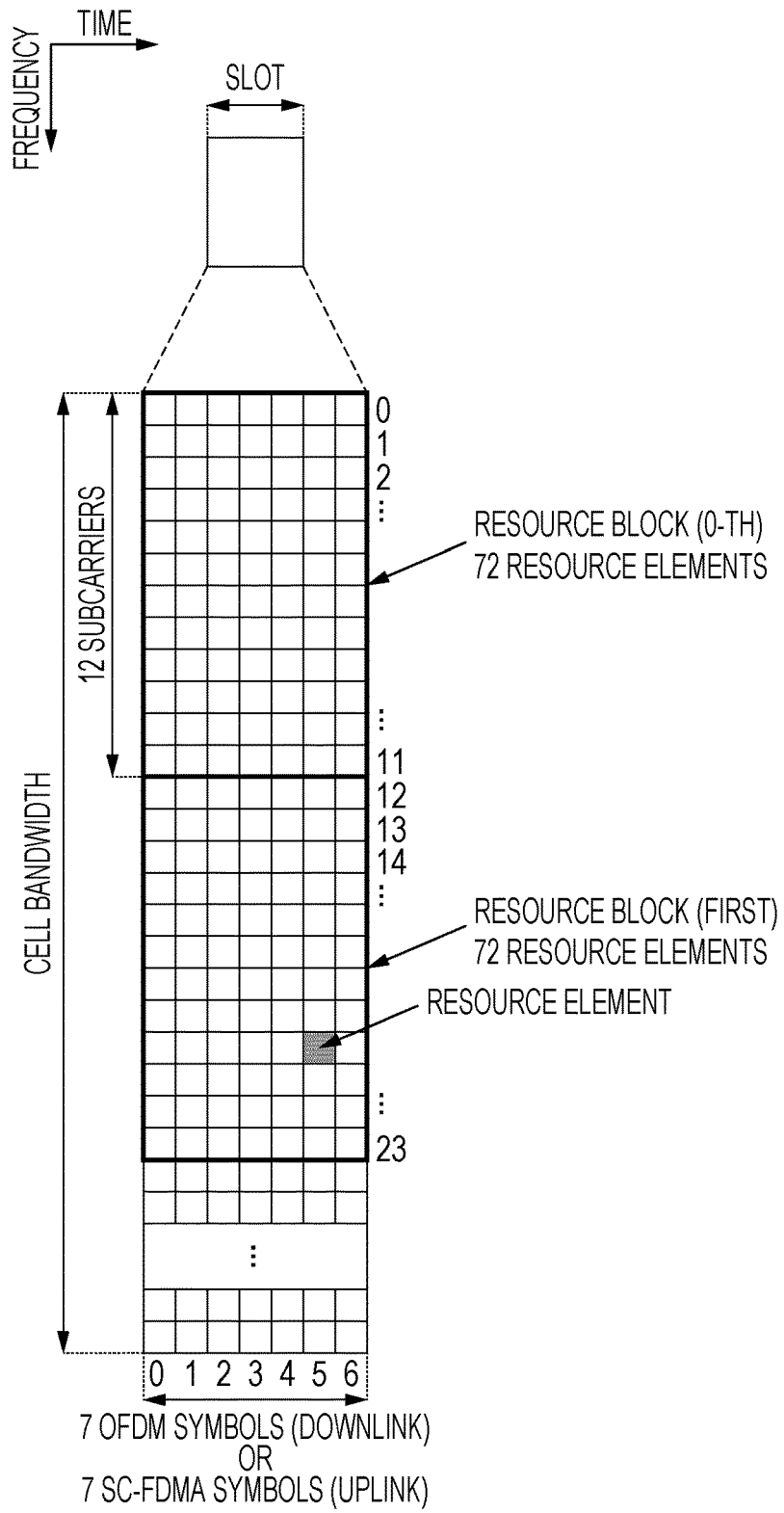
FIG. 3 is a diagram illustrating a configuration of a slot according to the present embodiment.

FIG. 3 is a diagram illustrating the configuration of the slot according to the present embodiment. According to the present embodiment, a normal Cyclic Prefix (CP) is applied to the OFDM symbol. Moreover, an extended Cyclic Prefix (CP) may be applied to the OFDM symbol. The physical signal or the physical channel that is transmitted on each of the slots is expressed by a resource grid. In FIG. 3, the horizontal axis is a time axis and the vertical axis is a frequency axis. In downlink, the resource grid is defined by multiple subcarriers and multiple OFDM symbols. In uplink, the resource grid is defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number and an OFDM symbol or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted on each of the subframes will be described below.

Figure 4:
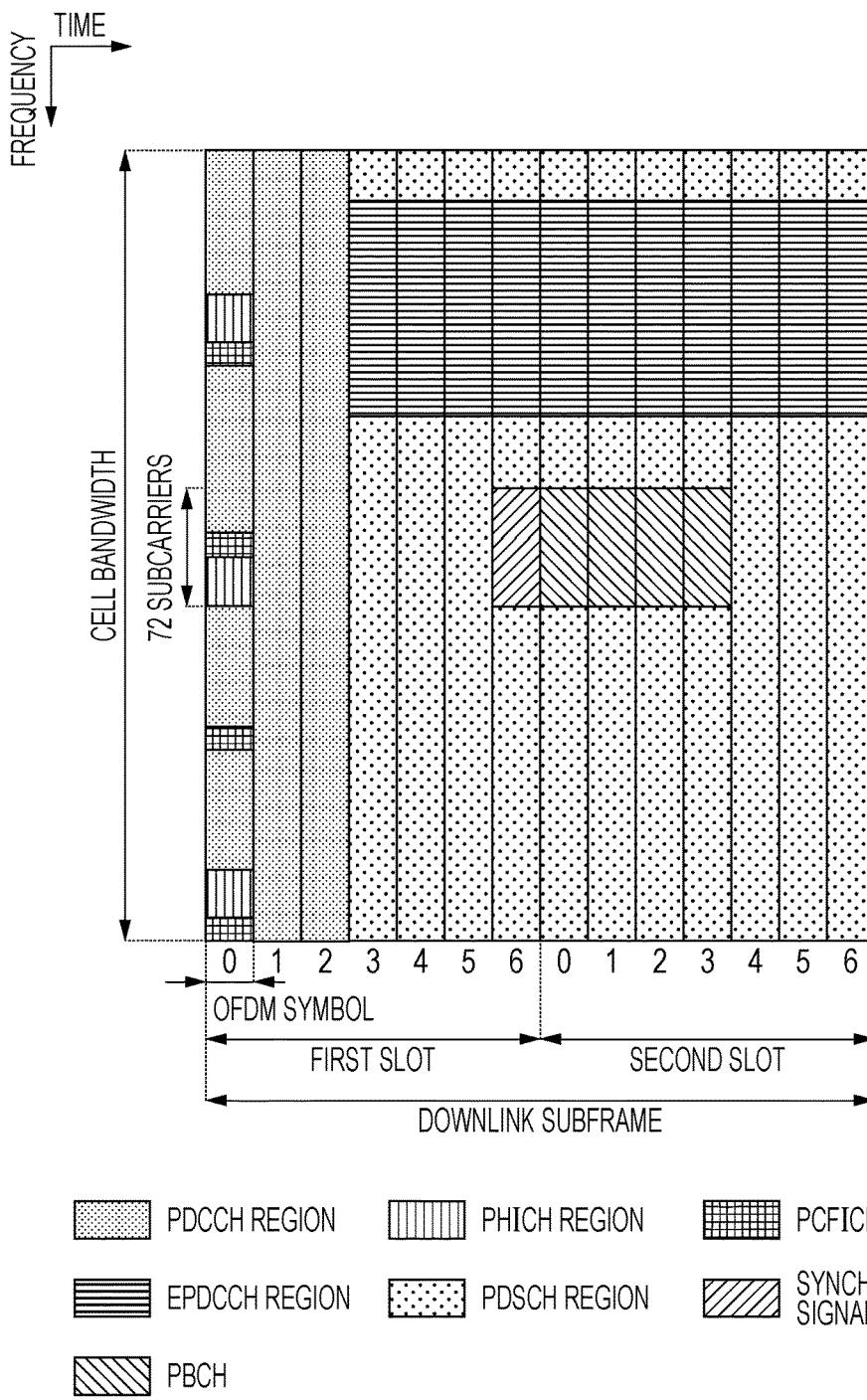
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis and the vertical axis is a frequency axis. The base station apparatus 3 may transmit the downlink physical channel (the PBCH, the PCFICH, the PHICH, the PDCCH, the EPDCCH, or the PDSCH), and the downlink physical signal (the synchronization signal or the downlink reference signal) on the downlink subframe. Moreover, the PBCH is transmitted only on subframe 0 within the radio frame. Moreover, the downlink reference signal is mapped to the resource elements that are distributed in the frequency domain and the time domain. The downlink reference signal is not illustrated in FIG. 4 for brief description.

Multiple PDCCHs may be frequency-multiplexed and time-multiplexed in a PDCCH region. Multiple EPDCCHs may be frequency-multiplexed, time-multiplexed, and space-multiplexed in an EPDCCH region. Multiple PDSCHs may be frequency-multiplexed and time-multiplexed in a PDSCH region. The PDCCH and, the PDSCH or the EPDCCH may be time-multiplexed. The PDSCH and the EPDCCH may be frequency-multiplexed.

Figure 5:
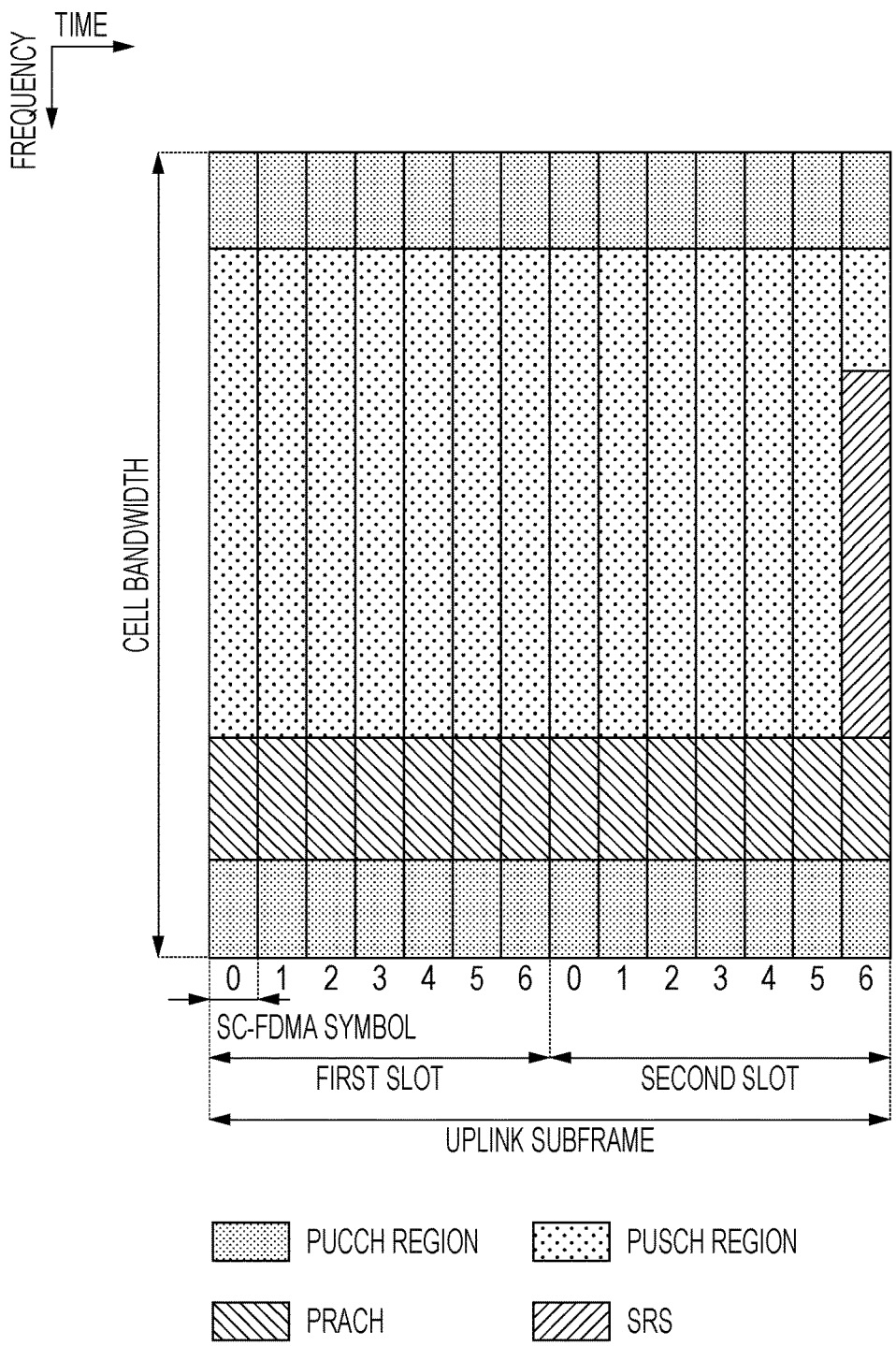
FIG. 5 is a diagram illustrating one example of the allocation of the physical channel and the mapping of the physical signal to an uplink subframe according to the present embodiment.

FIG. 5 is a diagram illustrating one example of the allocation of the physical channel and the mapping of the physical signal to the uplink subframe according to the present embodiment. In FIG. 5, the horizontal axis is a time axis and the vertical axis is a frequency axis. The terminal device 1 may transmit the uplink physical channel (the PUCCH, the PUSCH or the PRACH) and the uplink physical signal (the DMRS or the SRS) on the uplink subframe. In a PUCCH region, multiple PUCCHs are frequency-multiplexed, time-multiplexed, and code-multiplexed. In a PUSCH region, multiple PUSCHs are frequency-multiplexed and space-multiplexed. The PUCCH and the PUSCH may be frequency-multiplexed. The PRACH may be allocated over a single subframe or two subframes. Furthermore, multiple PRACHs may be code-multiplexed.

The SRS is transmitted using the last SC-FDMA symbol within the uplink subframe. More precisely, the SRS is mapped to the last SC-FDMA symbol within the uplink subframe. The terminal device 1 cannot transmit the SRS and the PUCCH/PUSCH/PRACH at the same time on a single SC-FDMA symbol in a single cell. On a single uplink subframe in the single cell, the terminal device 1 can transmit the PUSCH and/or the PUCCH using the SC-FDMA symbol with the last SC-FDMA symbol within the uplink subframe being excluded, and can transmit the SRS using the last SC-FDMA symbol within the uplink subframe. More precisely, on the single uplink subframe in the single cell, the terminal device 1 can transmit both of the SRS and the PUSCH/PUCCH. Moreover, the DMRS is time-multiplexed along with the PUCCH or the PUSCH. The DMRS is not illustrated in FIG. 5 for brief description.

Figure 6:
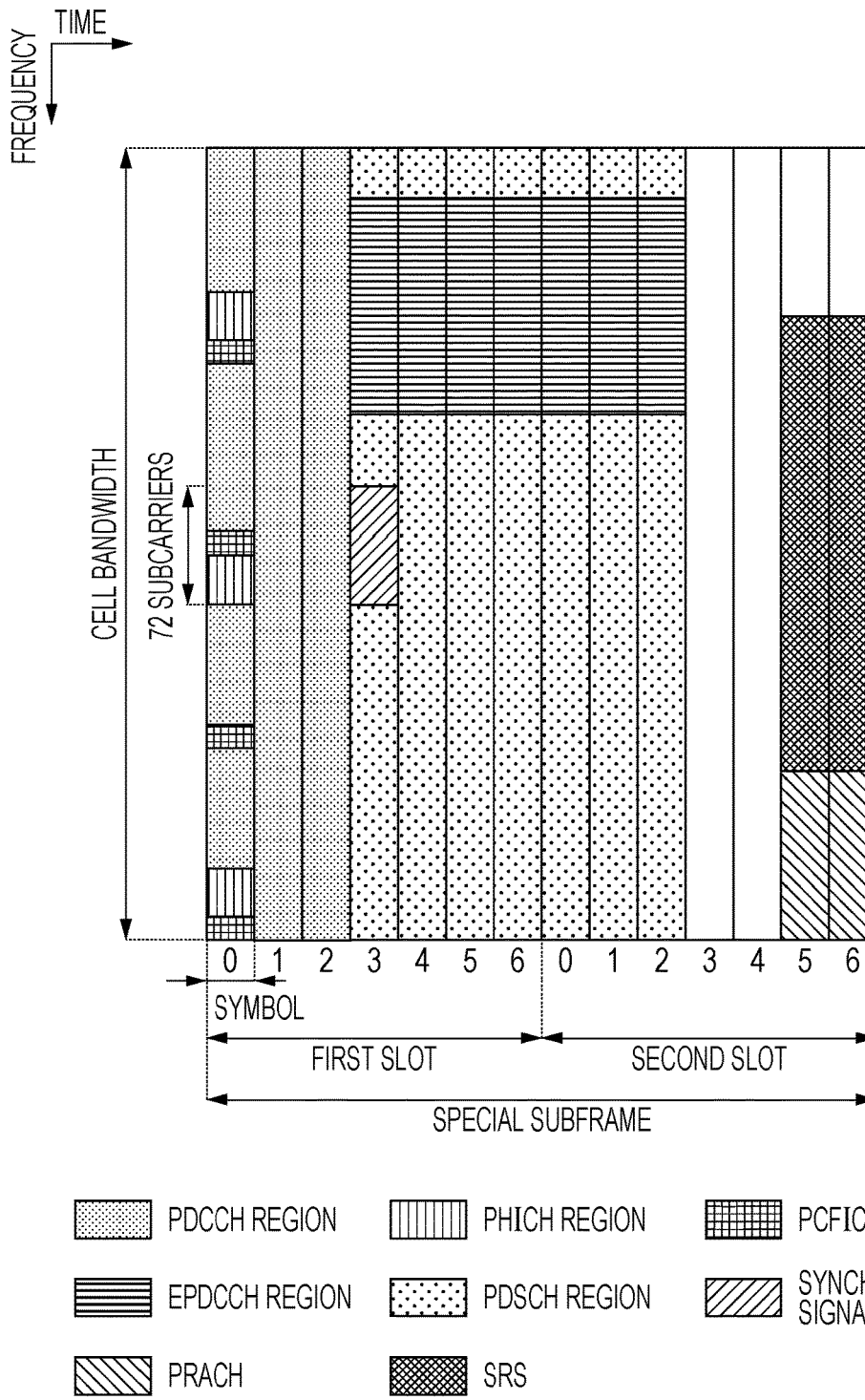
FIG. 6 is a diagram illustrating one example of the allocation of the physical channel and the mapping of the physical signal to a special subframe according to the present embodiment.

FIG. 6 is a diagram illustrating one example of the allocation of the physical channel and the mapping of the physical signal to the special subframe according to the present embodiment. In FIG. 6, the horizontal axis is a time axis and the vertical axis is a frequency axis. In FIG. 6, the DwPTS is constituted from first to 10-th SC-FDMA symbols within the special subframe, the GP is constituted from 11-th and 12-th SC-FDMA symbols within the special subframe, and the UpPTS is constituted from 13-th and 14-th SC-FDMA symbols within the special subframe.

The base station apparatus 3 may transmit the PCFICH, the PHICH, the PDCCH, the EPDCCH, the PDSCH, the synchronization signal, and the downlink reference signal, on the DwPTS of the special subframe. The base station apparatus 3 does not transmit the PBCH on the DwPTS of the special subframe. The terminal device 1 may transmit the PRACH and the SRS on the UpPTS of the special subframe. More precisely, the terminal device 1 does not transmit the PUCCH, the PUSCH, and the DMRS on the UpPTS of the special subframe.

A first uplink reference uplink-downlink configuration (UL reference UL-DL configuration), a first downlink reference uplink-downlink configuration (DL reference UL-DL configuration), a second UL reference UL-DL configuration, a second DL reference UL-DL configuration, and a transmission direction uplink-downlink configuration (transmission direction UL-DL configuration) will be described below.

The first UL reference UL-DL configuration, the first DL reference UL-DL configuration, the second UL reference UL-DL configuration, the second DL reference UL-DL configuration, and the transmission direction UL-DL configuration are defined by an uplink-downlink configuration (UL-DL configuration).

The UL-DL configuration is a configuration associated with a pattern of a subframe within the radio frame. The UL-DL configuration indicates which subframe within the radio frame is a downlink subframe, an uplink subframe, or a special subframe.

More specifically, the first UL reference UL-DL configuration, the second UL reference UL-DL configuration, the first DL reference UL-DL configuration, the second DL reference UL-DL configuration, and the transmission direction UL-DL configuration are defined by patterns of the downlink subframe, the uplink subframe, and the special subframe within the radio frame.

The patterns of the downlink subframe, the uplink subframe, and the special subframe indicate which of the downlink subframe, the uplink subframe, and the special subframe each of the subframes #0 to #9 is, and are preferably expressed by arbitrary combinations of D, U, and S (which indicate the downlink subframe, the uplink subframe, and the special subframe, respectively), in each of which a sum of lengths of D, U, and S is 10. More preferably, the head subframe (more precisely, subframe #0) is D, and the second subframe is S (more precisely, subframe #1).

FIG. 7 is a table illustrating one example of the UL-DL configuration according to the present embodiment. In FIG. 7, D indicates a downlink subframe, U indicates an uplink subframe, and S indicates a special subframe.

Setting of a UL-DL configuration i as the first or second UL reference UL-DL configuration is referred to as setting of a first or second UL reference UL-DL configuration i.

Setting of the UL-DL configuration i as the first or second DL reference UL-DL configuration is referred to as setting of a first or second DL reference UL-DL configuration i. Setting of the UL-DL configuration i as the transmission direction UL-DL configuration is referred to as setting of a transmission direction UL-DL configuration i.

A method will be described below in which the setting as each of the first UL reference UL-DL configuration, the first DL reference UL-DL configuration, and the transmission direction UL-DL configuration is provided.

The base station apparatus 3 determines the first UL reference UL-DL configuration, the first DL reference UL-DL configuration, and the transmission direction UL-DL configuration. The base station apparatus 3 transmits first information (TDD-Config) indicating the first UL reference UL-DL configuration, second information indicating the first DL reference UL-DL configuration, and third information indicating the transmission direction UL-DL configuration, to the terminal device 1.

For each of the multiple serving cells, the first UL reference UL-DL configuration, the second UL reference UL-DL configuration, the first DL reference UL-DL configuration, the second DL reference UL-DL configuration, and the transmission direction UL-DL configuration may be defined.

For each of the serving cells, the base station apparatus 3 transmits the first information, the second information, and the third information to the terminal device 1 for which multiple serving cells are configured. Moreover, for each of the serving cells, the first information, the second information, and the third information may be defined.

The terminal device 1 for which the multiple serving cells are configured may set the first UL reference UL-DL configuration, the first DL reference UL-DL configuration, and the transmission direction DL-UL configuration for each of the serving cells, based on the first information, the second information, and the third information.

It is preferable that the first information for the primary cell is included in a system information block type 1 message or an RRC message. It is preferable that the first information for the secondary cell is included in the RRC message. It is preferable that the second information for the primary cell is included in the RRC message. It is preferable that the second information for the secondary cell is included in the RRC message. It is preferable that the third information for the primary cell is included in the DCI format 5. It is preferable that the third information for the secondary cell is included in the DCI format 5.

Initial transmission of the system information block type 1 message is performed through the PDSCH on subframe 5 of a radio frame that satisfies SFN mod 8=0, and retransmission (repetition) thereof is performed on subframe 5 of a different radio frame that satisfies SFN mod 2=0. The system information block type 1 message includes information indicating a configuration (lengths of the DwPTS, the GP, and the UpPTS) of a special subframe. The system information block type 1 message is cell-specific information.

The RRC message is transmitted through the PDSCH. The RRC message is information or a signal that is processed in an RRC layer. The RRC message may be common to multiple terminal devices 1 within a cell, and may be dedicated to a specific terminal device 1.

A method of setting the first UL reference UL-DL configuration and the first DL reference UL-DL configuration will be described below.

Figure 8:
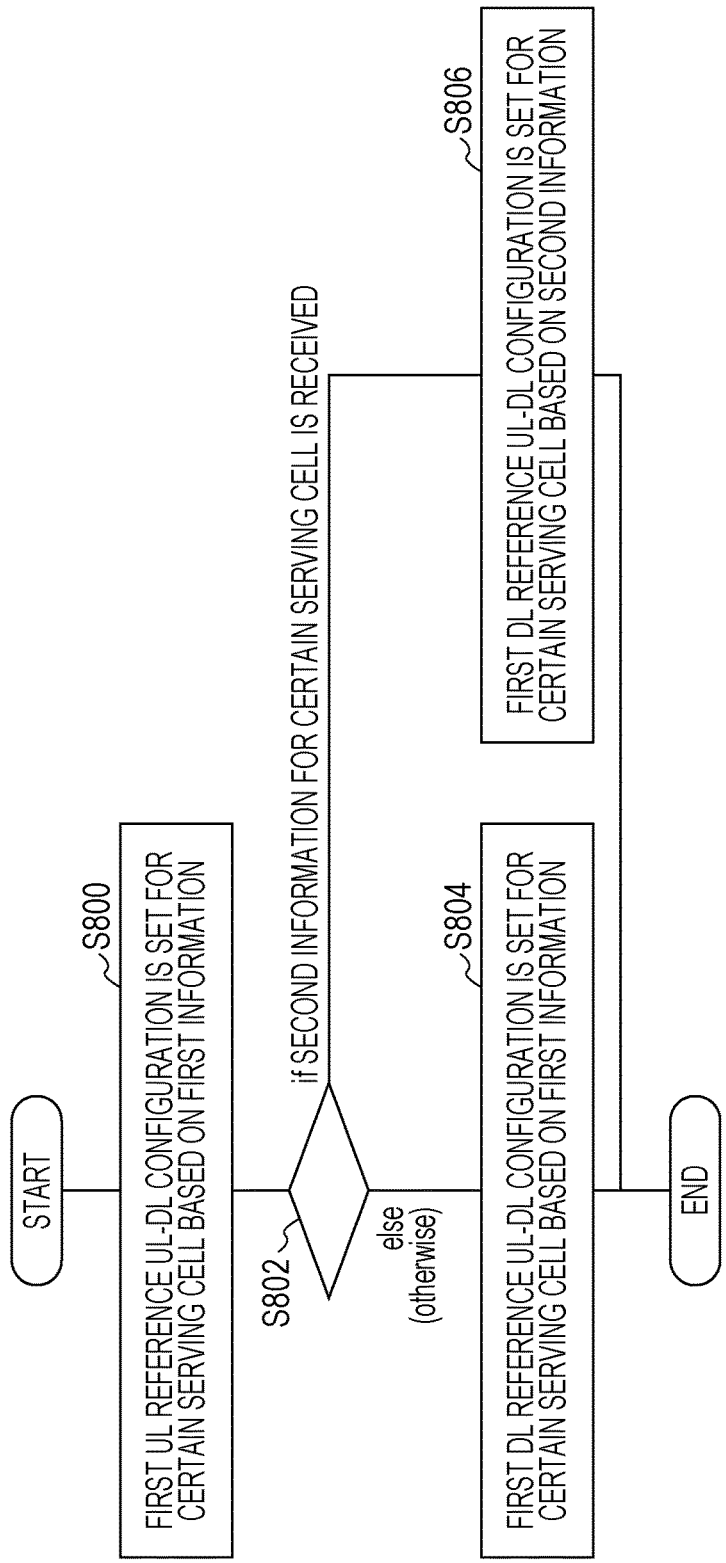
FIG. 8 is a flowchart illustrating a method of setting a first UL reference UL-DL configuration and a first DL reference UL-DL configuration according to the present embodiment.

FIG. 8 is a flowchart illustrating a method of setting the first UL reference UL-DL configuration and the first DL reference UL-DL configuration according to the present embodiment. The terminal device 1 executes the setting method in FIG. 8 on each of the multiple serving cells.

The terminal device 1 sets the first UL reference UL-DL configuration for a certain serving cell based on the first information (S800). The terminal device 1 determines whether or not the second information for the certain serving cell is received (S802). In a case where the second information for the certain serving cell is received, the terminal device 1 sets the first DL reference UL-DL configuration for the certain serving cell, based on the second information for the certain serving cell (S806). In a case where the second information for the certain serving cell is not received (else/otherwise), the terminal device 1 sets the first DL reference UL-DL configuration for the certain serving cell, based on the first information for the certain serving cell (S804).

The serving cell for which the first UL reference UL-DL configuration and the first DL reference UL-DL configuration are set based on the first information is also referred to as a serving cell for which timing TDD is not configured. The serving cell for which the first DL reference UL-DL configuration is set based on the second information is also referred to as a serving cell for which the timing TDD is configured.

Furthermore, in a case where the second information for a serving cell is not received, the first UL reference UL-DL configuration and the first DL reference UL-DL configuration may not be defined. In the case where the second information for a certain serving cell is not received, the terminal device 1 may set one UL-DL configuration for the certain serving cell, based on the first information for the certain serving cell.

The first UL reference UL-DL configuration is used at least for specifying a subframe that is available or is not available for uplink transmission in a serving cell. The terminal device 1 does not perform the uplink transmission on the subframe that is indicated as the downlink subframe by the first UL reference UL-DL configuration. The terminal device 1 does not perform the uplink transmission on the DwPTS and the GP of the subframe that is indicated as the special subframe by the first UL reference UL-DL configuration.

The first DL reference UL-DL configuration is used at least for specifying a subframe that is available or is not available for downlink transmission in a serving cell. The terminal device 1 does not perform the downlink transmission on the subframe that is indicated as the uplink subframe by the first DL reference UL-DL configuration. The terminal device 1 does not perform the downlink transmission on the UpPTS and the GP of the subframe that is indicated as the special subframe by the first DL reference UL-DL configuration.

The terminal device 1 that sets the first DL reference UL-DL configuration based on the first information may perform measurement (for example, measurement associated with the channel state information) that uses a downlink signal on the DwPTS of the downlink subframe or the special subframe that is indicated by the first UL reference UL-DL configuration or the first DL reference UL-DL configuration.

A method of setting the second UL reference UL-DL configuration will be described below.

In a case where multiple serving cells are configured for the terminal device 1 and the first UL reference UL-DL configurations for at least two serving cells are different from each other, the terminal device 1 and the base station apparatus 3 set the second UL reference UL-DL configuration.

In a case other than the case where multiple serving cells are configured for the terminal device 1 and the first UL reference UL-DL configurations for at least two serving cells are different from each other, the terminal device 1 and the base station apparatus 3 may not set the second UL reference UL-DL configuration.

The case other than the case where the first UL reference UL-DL configurations for at least two serving cells are different from each other is a case where the first UL reference UL-DL configurations for all the serving cells are the same. In a case where one serving cell is configured for the terminal device 1, the terminal device 1 and the base station apparatus 3 may not set the second UL reference UL-DL configuration.

Figure 9:
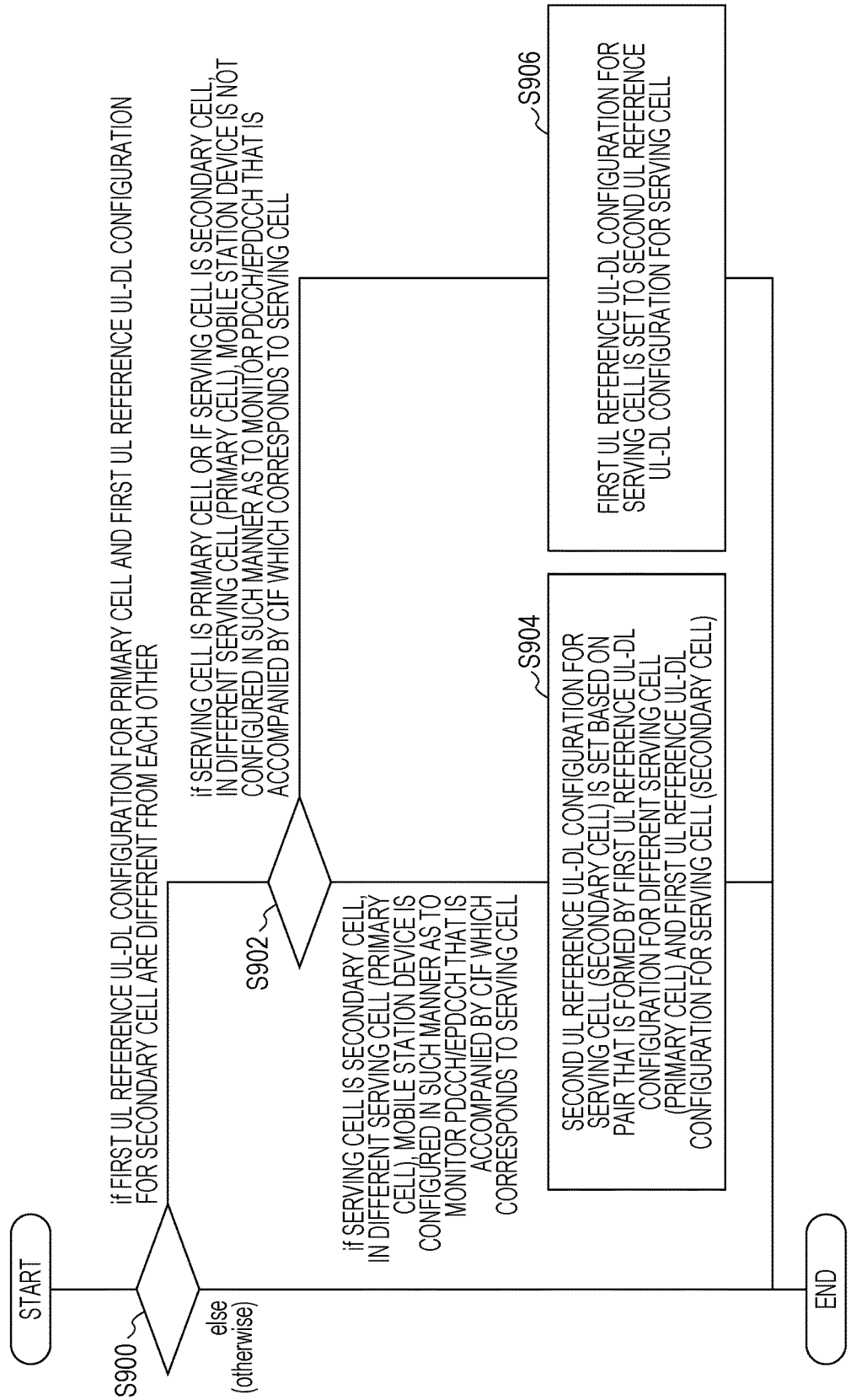
FIG. 9 is a flowchart illustrating a method of setting a second UL reference UL-DL configuration according to the present embodiment.

FIG. 9 is a flowchart illustrating a method of setting the second UL reference UL-DL configuration according to the present embodiment. In FIG. 9, one primary cell and one secondary cell are configured for the terminal device 1. The terminal device 1 executes the setting method in FIG. 9 on each of the primary cell and the secondary cell.

The terminal device 1 determines whether or not the first UL reference UL-DL configuration for the primary cell and the first UL reference UL-DL configuration for the secondary cell are different from each other (S900). In a case where the first UL reference UL-DL configuration for the primary cell and the first UL reference UL-DL configuration for the secondary cell are the same, the terminal device 1 ends processing that sets the second UL reference UL-DL configuration, without setting the second UL reference UL-DL configuration.

In a case where the first UL reference UL-DL configuration for the primary cell and the first UL reference UL-DL for the secondary cell are different from each other, the terminal device 1 determines whether the serving cell is a primary cell or a secondary cell, and/or whether, in a different serving cell, the terminal device 1 is configured in such a manner as to correspond to the serving cell and to monitor the PDCCH/EPDCCH that is accompanied by a carrier indicator field (CIF) (S902).

In a case where the serving cell is a secondary cell, and where, in a different serving cell, the terminal device 1 is configured in such a manner as to correspond to the serving cell (the secondary cell) and to monitor the PDCCH/EPDCCH that is accompanied by the CIF, the terminal device 1 sets the second UL reference UL-DL configuration for the serving cell (the secondary cell), based on a pair that is formed by the first UL reference UL-DL configuration for the different serving cell (the primary cell) and the first UL reference UL-DL configuration for the serving cell (the secondary cell) (S904).

In S904, the terminal device 1 sets the second UL reference UL-DL configuration for the serving cell (the secondary cell) based on a table in FIG. 10. FIG. 10 is a diagram illustrating a correspondence between the pair that is formed by the first UL reference UL-DL configuration for the different serving cell (the primary cell) and the first UL reference UL-DL configuration for the serving cell (the secondary cell), and the second UL reference UL-DL configuration for the secondary cell, according to the present embodiment.

In FIG. 10, a UL-DL configuration for the primary cell refers to the first UL reference UL-DL configuration for the different serving cell (the primary cell). In FIG. 10, a UL-DL configuration for the secondary cell refers to the first UL reference UL-DL configuration for the serving cell (the secondary cell).

For example, in a case where first UL reference UL-DL configuration 0 is set for the different serving cell (the primary cell) and where first UL reference UL-DL configuration 2 is set for the serving cell (the secondary cell), second UL reference UL-DL configuration 1 is set for the secondary cell.

In a case where the serving cell is a primary cell, or in a case where the serving cell is a secondary cell and where, in a different cell (the primary cell), the terminal device 1 is not configured in such a manner as to correspond to the serving cell (the secondary cell) and to monitor the PDCCH/EPDCCH that is accompanied by the CIF, the terminal device 1 sets the first UL reference UL-DL configuration for the serving cell to the second UL reference UL-DL configuration for the serving cell (S906).

The base station apparatus 3 sets the second UL reference UL-DL configuration based on the setting method in FIG. 9.

The monitoring of the PDCCH/EPDCCH that is accompanied by the CIF means attempting to decode the PDCCH or the EPDCCH according to the DCI format that includes the CIF. The CIF is a field to which a carrier indicator is mapped. A value of the carrier indicator indicates a serving cell to which the DCI format with which the carrier indicator is associated corresponds.

The terminal device 1 that, in a different serving cell, is configured in such a manner as to correspond to a serving cell and to monitor the PDCCH/EPDCCH that is accompanied by the CIF monitors the PDCCH/EPDCCH that is accompanied by the CIF in the different serving cell.

It is preferable that the terminal device 1 that, in a different serving cell, is configured in such a manner as to correspond to a serving cell and to monitor the PDCCH/EPDCCH that is accompanied by the CIF receives the third information for the serving cell through the PDCCH/EPDCCH in the different serving cell.

The terminal device 1 that, in a different serving cell, is not configured in such a manner as to correspond to a serving cell and to monitor the PDCCH/EPDCCH that is accompanied by the CIF monitors the PDCCH/EPDCCH that is accompanied by the CIF or is not accompanied by the CIF in the serving cell.

It is preferable that the terminal device 1 that, in a different serving cell, is not configured in such a manner as to correspond to a serving cell and to monitor the PDCCH/EPDCCH that is accompanied by the CIF receives the third information for the serving cell through the PDCCH/EPDCCH in the different serving cell.

The PDCCH/EPDCCH for the primary cell is transmitted in the primary cell. It is preferable that the third information for the primary cell is transmitted through the PDCCH/EPDCCH in the primary cell.

The base station apparatus 3 transmits to the terminal device 1 a parameter (cif-Presence-r10) indicating whether or not the CIF is included in the DCI format that is transmitted in the primary cell.

For each of the secondary cells, the base station apparatus 3 transmits to the terminal device 1 a parameter (CrossCarrierSchedulingConfig-r10) associated with cross carrier scheduling.

The parameter (CrossCarrierSchedulingConfig-r10) includes a parameter (schedulingCellInfo-r10) indicating whether or not the PDCCH/EPDCCH that corresponds to an associated secondary cell is transmitted in the secondary cell or is transmitted in a different cell.

In a case where the parameter (schedulingCellInfo-r10) indicates that the PDCCH/EPDCCH which corresponds to an associated secondary cell is transmitted in the secondary cell, the parameter (schedulingCellInfo-r10) includes a parameter (cif-Presence-r10) indicating whether or not the CIF is included in the DCI format that is transmitted in the secondary cell.

In a case where the parameter (schedulingCellInfo-r10) indicates that the PDCCH/EPDCCH which corresponds to an associated secondary cell is transmitted in a different serving cell, the parameter (schedulingCellInfo-r10) includes a parameter (schedulingCellId) indicating in which serving cell the downlink allocation for the associated secondary cell is sent.

A method of setting the second DL reference UL-DL configuration will be described below.

In a case where multiple serving cells are configured for the terminal device 1 and the first DL reference UL-DL configurations for at least two serving cells are different from each other, the terminal device 1 and the base station apparatus 3 set the second DL reference UL-DL configuration. In a case other than the case where the multiple serving cells are configured for the terminal device 1 and the first DL reference UL-DL configurations for at least the two serving cells are different from each other, the terminal device 1 and the base station apparatus 3 may not configure the second DL reference UL-DL configuration.

The case other than the case where the first DL reference UL-DL configurations for at least the two serving cells are different from each other is a case where the first DL reference UL-DL configurations for all the serving cells are the same. In the case where one serving cell is configured for the terminal device 1, the terminal device 1 and the base station apparatus 3 may not set the second DL reference UL-DL configuration.

Figure 11:
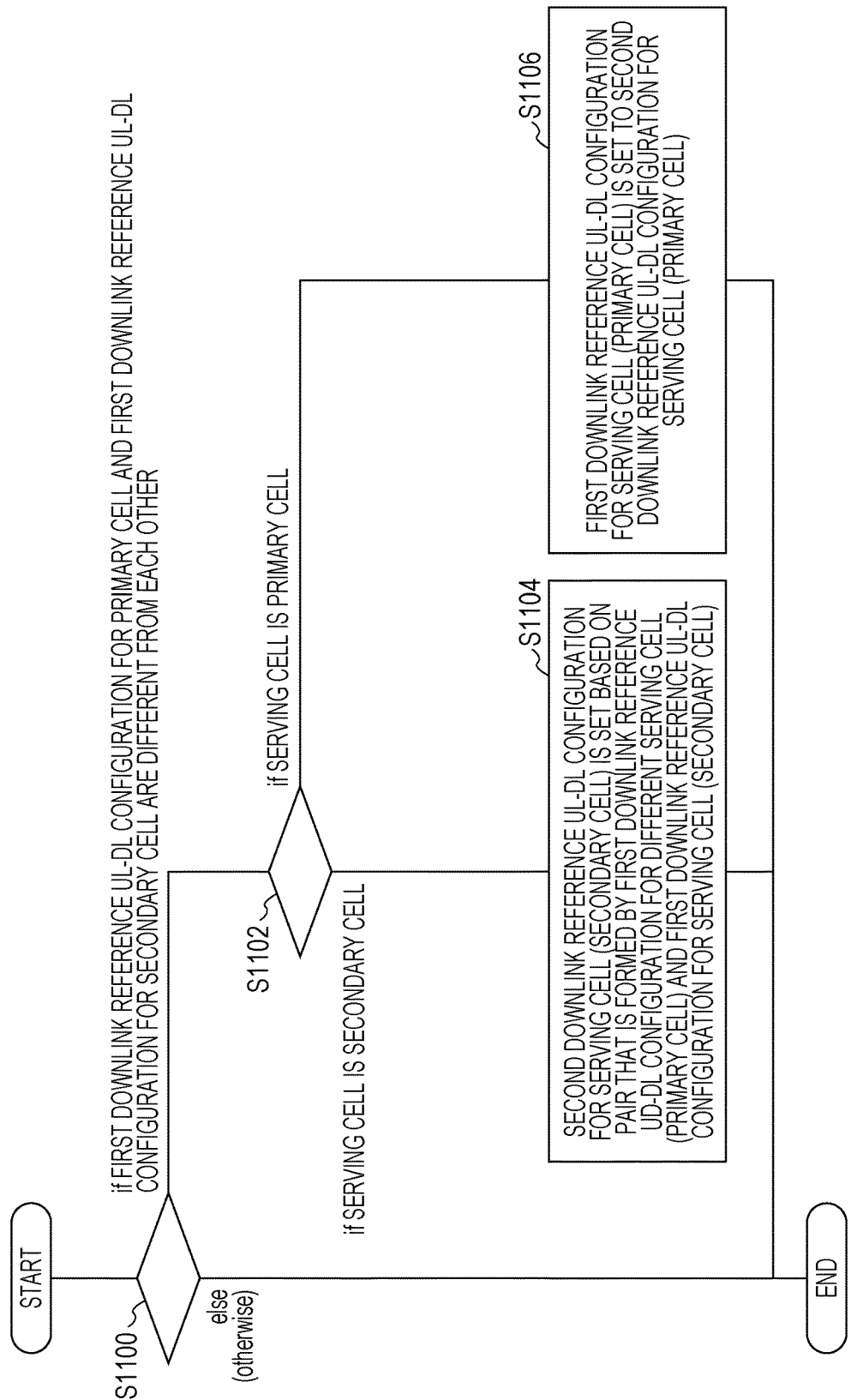
FIG. 11 is a flowchart illustrating a method of setting a second DL reference UL-DL configuration according to the present embodiment.

FIG. 11 is a flowchart illustrating the method of setting the second DL reference UL-DL configuration according to the present embodiment. In FIG. 11, one primary cell and one secondary cell are configured for the terminal device 1. The terminal device 1 executes the setting method in FIG. 11 on each of the primary cell and the secondary cell.

The terminal device 1 determines whether or not the first DL reference UL-DL configuration for the primary cell and the first DL reference UL-DL configuration for the secondary cell are different from each other (S1100). In a case where the first DL reference UL-DL configuration for the primary cell and the first DL reference UL-DL configuration for the secondary cell are the same, the terminal device 1 ends processing that sets the second DL reference UL-DL configuration, without setting the second DL reference UL-DL configuration.

In a case where the first DL reference UL-DL configuration for the primary cell and the first DL reference UL-DL configuration for the second cell are different from each other, the terminal device 1 determines whether or not the serving cell is a primary cell or a secondary cell (S1102).

In a case where the serving cell is a secondary cell, the second UL reference UL-DL configuration for the serving cell (the secondary cell) is set based on a pair that is formed by the first DL reference UL-DL configuration for a different serving cell (the primary cell) and the first DL reference UL-DL configuration for the serving cell (the secondary cell) (S1104).

In S1104, the terminal device 1 sets the second DL reference UL-DL configuration for the serving cell (the secondary cell) based on a table in FIG. 12. FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell, according to the present embodiment.

In FIG. 12, the UL-DL configuration for the primary cell refers to the first DL reference UL-DL configuration for the primary cell. In FIG. 12, the UL-DL configuration for the secondary cell refers to the first DL reference UL-DL configuration for the secondary cell.

In a case where the pair that is formed by the first DL reference UL-DL configuration for the primary cell and the first DL reference UL-DL configuration for the secondary cell belongs to set 1 in FIG. 12, the second DL reference UL-DL configuration for the secondary cell is defined in set 1.

In a case where, in the primary cell, the terminal device 1 is not configured in such a manner as to correspond to the secondary cell and to monitor the PDCCH/EPDCCH that is accompanied by the CIF, and where the pair that is formed by the first DL reference UL-DL configuration for the primary cell and the first DL reference UL-DL configuration for the secondary cell belongs to set 2 in FIG. 12, the second DL reference UL-DL configuration for the secondary cell is defined in set 2.

In a case where, in the primary cell, the terminal device 1 is not configured in such a manner as to correspond to the secondary cell and to monitor the PDCCH/EPDCCH that is accompanied by the CIF, and where the pair that is formed by the first DL reference UL-DL configuration for the primary cell and the first DL reference UL-DL configuration for the secondary cell belongs to set 3 in FIG. 12, the second DL reference UL-DL configuration for the secondary cell is defined in set 3.

In a case where, in the primary cell, the terminal device 1 is configured in such a manner as to correspond to the secondary cell and to monitor the PDCCH/EPDCCH that is accompanied by the CIF, and where the pair that is formed by the first DL reference UL-DL configuration for the primary cell and the first DL reference UL-DL configuration for the secondary cell belongs to set 4 in FIG. 12, the second DL reference UL-DL configuration for the secondary cell is defined in set 4.

In a case where, in the primary cell, the terminal device 1 is configured in such a manner as to correspond to the secondary cell and to monitor the PDCCH/EPDCCH that is accompanied by the CIF, and where the pair that is formed by the first DL reference UL-DL configuration for the primary cell and the first DL reference UL-DL configuration for the secondary cell belongs to set 5 in FIG. 12, the second DL reference UL-DL configuration for the secondary cell is defined in set 5.

For example, in a case where first DL reference UL-DL configuration 1 is set for the primary cell and first DL reference UL-DL configuration 0 is set for the secondary cell, second DL reference UL-DL configuration 1 is set for the secondary cell.

In a case where the serving cell is a primary cell, the first DL reference UL-DL configuration for the serving cell (the primary cell) is set to the second DL reference UL-DL configuration for the serving cell (the primary cell) (S1106).

Moreover, the base station apparatus 3 sets the second DL reference UL-DL configuration based on the setting method in FIG. 11.

The first UL reference UL-DL configuration and the second UL reference UL-DL configuration are referred to as a UL reference UL-DL configuration, and the first DL reference UL-DL configuration and the second DL reference UL-DL configuration are referred to as a DL reference UL-DL configuration.

Furthermore, in a case where one primary cell is configured, or in a case where one primary cell and one secondary cell are configured and the first UL reference UL-DL configuration for the primary cell and the first UL reference UL-DL configuration for the secondary cell are the same, a UL reference UL-DL configuration is the first UL reference UL-DL configuration.

Furthermore, in a case where one primary cell and one secondary cell are configured and where the first UL reference UL-DL configuration for the primary cell and the first UL reference UL-DL configuration for the secondary cell are different from each other, the UL reference UL-DL configuration is the second UL reference UL-DL configuration.

Furthermore, in the case where one primary cell is configured, or in a case where one primary cell and one secondary cell are configured and where the first DL reference UL-DL configuration for the primary cell and the first DL reference UL-DL configuration for the secondary cell are the same, a DL reference UL-DL configuration is the first DL reference UL-DL configuration.

Furthermore, in a case where one primary cell and one secondary cell are configured and where the first DL reference UL-DL configuration for the primary cell and the first DL reference UL-DL configuration for the secondary cell are different from each other, the DL reference UL-DL configuration is the second DL reference UL-DL configuration.

The subframe that is indicated as the uplink subframe by the UL reference UL-DL configuration and that is indicated as the downlink subframe by the DL reference UL-DL configuration is also referred to as a first flexible subframe. The first flexible subframe is a subframe that is reserved for uplink and downlink transmission. That is, the first flexible subframe is a subframe that is used as the uplink subframe or the downlink subframe.

The subframe that is indicated as the special subframe by the UL reference UL-DL configuration and that is indicated as the downlink subframe by the DL reference UL-DL configuration is also referred to as a second flexible subframe. The second flexible subframe is a subframe that is reserved only for the downlink transmission. The second flexible subframe is a subframe that is reserved for the downlink transmission on the DwPTS and the uplink transmission on the UpPTS. That is, the second flexible subframe that is a subframe that is used as the downlink subframe or the special subframe.

The UL reference UL-DL configuration will be described in detail below.

The UL reference UL-DL configuration is used for specifying (selecting or determining) a correspondence between a subframe n to which the PDCCH/EPDCCH/PHICH is allocated and a subframe n+k to which the PUSCH to which the PDCCH/EPDCCH/PHICH described above corresponds is allocated.

In a case where multiple serving cells are configured, the corresponding UL reference UL-DL configuration is used for determining a correspondence between a subframe to which the PDCCH/EPDCCH/PHICH is allocated and a subframe to which the PUSCH to which the PDCCH/EPDCCH/PHICH described above corresponds is allocated.

FIG. 13 is a diagram illustrating the correspondence between the subframe n to which the PDCCH/EPDCCH/PHICH is allocated and the subframe n+k to which the PUSCH to which the PDCCH/EPDCCH/PHICH described above corresponds is allocated, according to the present embodiment. The terminal device 1 specifies (selects or determines) a value k in accordance with a table in FIG. 13.

When descriptions are provided below referring to FIG. 13, the UL reference UL-DL configuration is simply referred to as a UL-DL configuration.

In FIG. 13, in the case where one primary cell is set, or in the case where one primary cell and one secondary cell are configured and where the first UL reference UL-DL configuration for the primary cell and the first UL reference UL-DL configuration for the secondary cell are the same, the UL-DL configuration refers to the first UL reference UL-DL configuration.

In FIG. 13, in the case where one primary cell and one secondary cell are configured and where the first UL reference UL-DL configuration for the primary cell and the first UL reference UL-DL configuration for the secondary cell are different from each other, the UL-DL configuration refers to the second UL reference UL-DL configuration.

In a case where, on the subframe n, the terminal device 1 corresponds to the serving cell for which UL-DL configurations 1 to 6 are set, and detects the PDCCH/EPDCCH, which is accompanied by an uplink grant of which the target is defined as the terminal device 1, the terminal device 1 performs PUSCH transmission in accordance with the uplink grant on the subframe n+k that is specified (selected or determined) based on the table in FIG. 13.

In a case where, on the subframe n, the terminal device 1 corresponds to the serving cell for which the UL-DL configurations 1 to 6 are set, and detects the PHICH that is accompanied by a NACK of which the target is defined as the terminal device 1, the terminal device 1 performs the PUSCH transmission on the subframe n+k that is specified (selected or determined) based on the table in FIG. 13.

A two-bit uplink index (UL index) is included in the uplink grant that corresponds to the serving cell for which the UL-DL configuration 0 is set, and of which the target is defined as the terminal device 1. The uplink index (UL index) is not included in the uplink grant that corresponds to the serving cell for which the UL-DL configurations 1 to 6 are set, and of which the target is defined as the terminal device 1.

In a case where, on the subframe n, a Most Significant Bit (MSB) of the uplink index that is included in the uplink grant which corresponds to the serving cell for which the UL-DL configuration 0 is set is set to 1, the terminal device 1 adjusts the PUSCH transmission in accordance with the uplink grant on the subframe n+k that is specified (selected or determined) based on the table in FIG. 13.

In a case where, in a first resource set on a subframe n=0 or 5, the PHICH that is accompanied by the NACK which corresponds to the serving cell for which the UL-DL configuration 0 is set is received, the terminal device 1 adjusts the PUSCH transmission in accordance with the PHICH on the subframe n+k that is specified (selected or determined) based on the table in FIG. 13.

In a case where, on the subframe n, a Least Significant Bit (LSB) of the uplink index that is included in the uplink grant which corresponds to the serving cell for which the UL-DL configuration 0 is set is set to 1, the terminal device 1 adjusts the PUSCH transmission in accordance with the uplink grant on the subframe n+7.

In a case where, in a second resource set on the subframe n=0 or 5, the PHICH that is accompanied by the NACK which corresponds to the serving cell for which the UL-DL configuration 0 is set is received, the terminal device 1 adjusts the PUSCH transmission in accordance with the uplink grant on the subframe n+7.

In a case where, on the subframe n=1 or 6, the PHICH that is accompanied by the NACK which corresponds to the serving cell for which the UL-DL configuration 0 is set is received, the terminal device 1 adjusts the PUSCH transmission in accordance with the uplink grant on the subframe n+7.

For example, in a case where in [SFN=m, subframe 1], the PDCCH/EPDCCH/PHICH that corresponding to the serving cell for which the UL-DL configuration 0 is set is detected, the terminal device 1 adjusts the PUSCH transmission on a subframe [SFN=m, subframe 7] before which six subframes are present.

The UL reference UL-DL configuration is used for specifying (selecting or determining) a correspondence between the subframe n to which the PUSCH is allocated and the subframe n+k to which the PHICH to which the PUSCH described above corresponds is allocated.

In the case where the multiple serving cells are configured, in each of the multiple serving cells, the corresponding UL reference UL-DL configuration is used for determining the correspondence between the subframe n to which the PUSCH is allocated and the subframe n+k to which the PHICH to which the PUSCH described above corresponds is allocated.

FIG. 14 is a diagram illustrating an example of the correspondence between the subframe n to which the PUSCH is allocated, and the subframe n+k to which the PHICH to which the PUSCH described above corresponds is allocated, according to the present embodiment. The terminal device 1 specifies (selects or determines) a value k in accordance with a table in FIG. 14.

When descriptions are provided below referring to FIG. 14, the UL reference UL-DL configuration is simply referred to as the UL-DL configuration.

In FIG. 14, in the case where one primary cell is set, or in the case where one primary cell and one secondary cell are configured and where the first UL reference UL-DL configuration for the primary cell and the first UL reference UL-DL configuration for the secondary cell are the same, the UL-DL configuration refers to the first UL reference UL-DL configuration.

In FIG. 14, in the case where one primary cell and one secondary cell are configured and where the first UL reference UL-DL configuration for the primary cell and the first UL reference UL-DL configuration for the secondary cell are different from each other, the UL-DL configuration refers to the second UL reference UL-DL configuration.

In a case where, on the subframe n, the PUSCH transmission is scheduled, the terminal device 1 determines a PHICH resource on the subframe n+k that is specified from the table in FIG. 14.

For example, in a case where, for the serving cell for which the UL-DL configuration 0 is set, the PUSCH transmission is scheduled in [SFN=m, subframe n=2], the PHICH resource is determined in [SFN=m, subframe n=6].

The DL reference UL-DL configuration will be described in detail below.

The DL reference UL-DL configuration is used for specifying (selecting or determining) a correspondence between the subframe n to which the PDSCH is allocated and the subframe n+k on which the HARQ-ACK corresponding to the PDSCH described above is transmitted.

In the case where the multiple serving cells are configured, in each of the multiple serving cells, the corresponding DL reference UL-DL configuration is used for specifying (selecting or determining) the correspondence between the subframe n to which the PDSCH is allocated and the subframe n+k to which the HARQ-ACK corresponding to the PDSCH described above is transmitted.

FIG. 15 is a diagram illustrating a correspondence between a subframe n−k to which the PDSCH is allocated and the subframe n on which the HARQ-ACK to which the PDSCH described above corresponds is transmitted. The terminal device 1 specifies (selects or determines) a value k in accordance with a table in FIG. 15.

When descriptions are provided below referring to FIG. 15, the DL reference UL-DL configuration is simply referred to as the UL-DL configuration.

In FIG. 15, in the case where one primary cell is configured, or in the case where one primary cell and one secondary cell are configured and where the first DL reference UL-DL configuration for the primary cell and the first DL reference UL-DL configuration for the secondary cell are the same, the UL-DL configuration refers to the first DL reference UL-DL configuration.

In FIG. 15, in the case where one primary cell and one secondary cell are configured and where the first DL reference UL-DL configuration for the primary cell and the first DL reference UL-DL configuration for the secondary cell are different from each other, the UL-DL configuration refers to the second DL reference UL-DL configuration.

In a case where, on the subframe n−k (k is specified by the table in FIG. 15) in the serving cell, the terminal device 1 detects the PDSCH transmission that requires the performing of the transmission of the corresponding HARQ-ACK of which the target is defined as the terminal device 1 is detected, the terminal device 1 transmits the HARQ-ACK on the subframe n.

For example, the terminal device 1 does not make a HARQ-ACK response to the PDSCH transmission that is used for transmission of system information. For example, the terminal device 1 makes the HARQ-ACK response to the PDSCH transmission that is scheduled by the DCI format which is accompanied by CRC that is scrambled with a C-RNTI.

For example, on the subframe n=2, the terminal device 1 performs the transmission of the HARQ-ACK in response to the PDSCH that is received on a subframe n−6 and/or n−7, in the serving cell for which the UL-DL configuration 1 is set.

Moreover, the first DL reference UL-DL configuration may not be defined for the serving cell that does not receive the second information. In this case, the terminal device 1 and the base station apparatus 3 may perform processing that is performed based on the first DL reference UL-DL configuration described above, based on the first UL reference UL-DL configuration (the UL-DL configuration for the serving cell). The serving cell that does not receive the second information is a serving cell for which the timing TDD is not configured.

For example, in a case where one primary cell and one secondary cell are set, where the second information for the secondary cell is received without the second information for the primary cell being received, where the first UL reference UL-DL configuration (the UL-DL configuration for the serving cell) for the primary cell and the first DL reference UL-DL configuration for the secondary cell are different from each other, and where the serving cell is a secondary cell, the second DL reference UL-DL configuration for the serving cell (the secondary cell) may be set based on a pair that is formed by the first UL reference UL-DL configuration for a different serving cell (the primary cell)

and the first DL reference UL-DL configuration for the serving cell (the secondary cell).

For example, in the case where one primary cell and one secondary cell are set, where the second information for the secondary cell is received without the second information for the primary cell being received, and where the first UL reference UL-DL configuration (the UL-DL configuration for the serving cell) for the primary cell and the first DL reference UL-DL configuration for the secondary cell are different from each other, in each of the two second cell, the corresponding second DL reference UL-DL configuration may be used for specifying (selecting or determining) the correspondence between the subframe n to which the PDSCH is allocated and the subframe n+k on which the HARQ-ACK corresponding to the PDSCH described above is transmitted.

For example, in a case where one primary cell and one secondary cell are set, where the second information for the secondary cell is received without the second information for the primary cell being received, and where the first UL reference UL-DL configuration (the UL-DL configuration for the serving cell) for the primary cell and the first DL reference UL-DL configuration for the secondary cell are the same, in the primary cell, the corresponding first UL reference UL-DL configuration (the UL-DL configuration for the serving cell) may be used for specifying (selecting or determining) the correspondence between the subframe n to which the PDSCH is allocated and the subframe n+k on which the HARQ-ACK corresponding to the PDSCH described above is transmitted, and, in the secondary cell, the corresponding first DL reference UL-DL configuration may be used for specifying (selecting or determining) the correspondence between the subframe n to which the PDSCH is allocated and the subframe n+k on which the HARQ-ACK corresponding to the PDSCH described is transmitted.

For example, in the case where one primary cell and one secondary cell are set, where the second information for the secondary cell is received without the second information for the primary cell being received, and where the first UL reference UL-DL configuration (the UL-DL configuration for the serving cell) for the primary cell and the first DL reference UL-DL configuration for the secondary cell are different from each other, in FIGS. 10 and 12, the UL-DL configuration for the primary cell refers to the first UL reference UL-DL configuration for the primary cell.

A method of setting the transmission direction UL-DL configuration will be described below.

The DCI format 5 is used for transmission of at least one piece of third information indicating a transmission direction configuration. The DCI format 3 may be used for the transmission of multiple pieces of third information to multiple terminal devices, respectively. The DCI format 3 may be used for the transmission of the multiple pieces of third information to multiple cells, respectively.

The base station apparatus 3 transmits a higher layer signal including information indicating a value of a TDD-RNTI and information indicating a parameter tddconfig-index that corresponds to ServCellIndex, to the terminal device 1.

ServCellIndexx is an index of the serving cell. ServCellIndex of the primary cell is 0. ServCellIndex of the secondary cell is controlled through a network and is selected from among 1 to 7. Moreover, ServCellIndex is numbered individually for the terminal device. That is, a certain cell may correspond to different ServCellIndex for each of the multiple terminal devices.

A Cyclic Redundancy Check (CRC) parity bit is attached to the DCI format. The CRC parity bit that is attached to the DCI format 5 is scrambled with the TDD-RNTI.

Based on the parameter tddconfig-index that is given by the higher layer, the terminal device 1 specifies the third information for the terminal device 1 itself, which is included in the DCI format 5 to which the CRC parity bit that is scrambled by the TDD-RNTI is attached.

FIG. 16 is a diagram illustrating one example of a configuration of a correspondence between ServCellIndex and an index of the third information according to the present embodiment. In FIG. 16, "1000000000000000" as the value of the TDD-RNTI is configured for a terminal device 1A and a terminal device 1B. In FIG. 16, ServCellIndex 0 and tdd config-index 2 correspond to the terminal device 1A.

Figure 17:
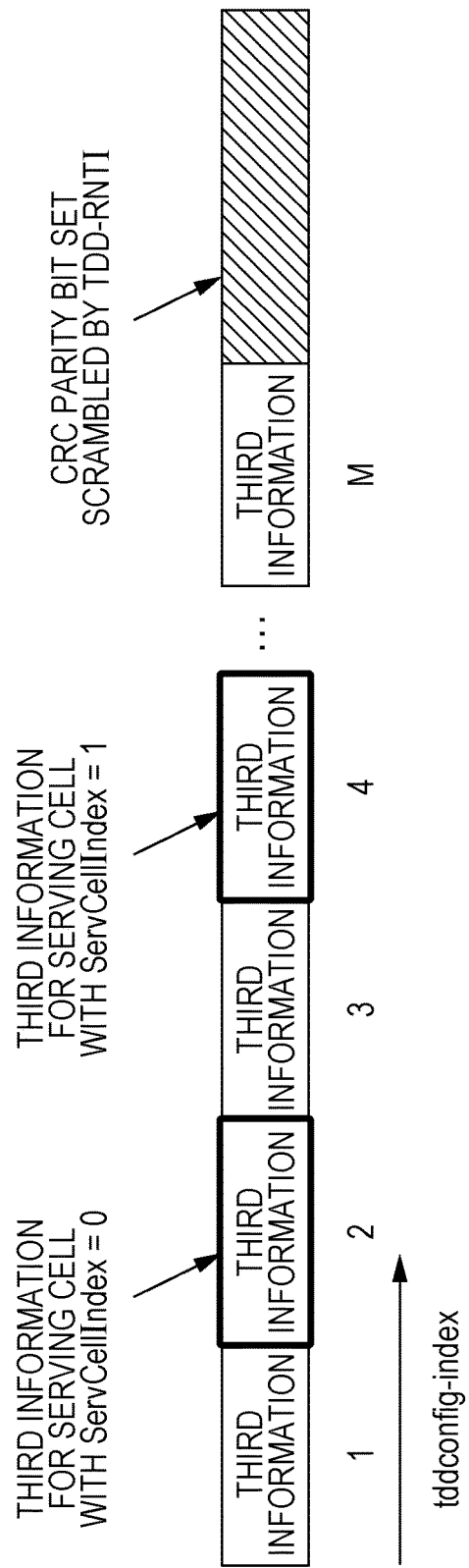
FIG. 17 is a diagram illustrating one example of a DCI format 5 including the third information according to the present embodiment.

FIG. 17 is a diagram illustrating one example of the DCI format 5 including the third information according to the present embodiment. In FIG. 17, the third information that corresponds to each of tddconfig-index 1 to tddconfig-index M is included in the DCI format 5. In FIG. 17, the terminal device 1A determines that the third information corresponding to tddconfig-index 2 corresponds to the serving cell with SerCellIndex 0. In FIG. 17, the terminal device 1A determines that the third information corresponding to tddconfig-index 4 corresponds to the serving cell (the secondary cell) with SerCellIndex 1.

The DCI format 5 may be transmitted and received in Common Search Space (CSS) or UE-specific Search Space (USS). The CSS is a region in which multiple terminal devices 1 perform monitoring of the PDCCH/EPDCCH together. The USS is a region that is defined based on at least the Cell-Radio Network Temporary Identifier (C-RNTI).

It is preferable that the base station apparatus 3 transmits the DCI format 5 only on the CSS of the primary cell. It is preferable that the terminal device 1 monitors the DCI format 5 only on the CSS of the primary cell. The terminal device 1 may attempt to decode the PDCCH/EPDCCH for the DCI format 5 on the CSS of the primary cell.

Moreover, the downlink grant and the uplink grant may be transmitted and received on the Common Search Space (CSS) or the UE-specific Search Space (USS). The CRC parity bit that is attached to the downlink grant or the uplink grant scrambled with the C-RNTI or Semi Persistent Scheduling Cell-Radio Network Temporary Identifier (SPS C-RNTI). The C-RNTI and the SPS C-RNTI are identifiers for identifying a terminal device within a cell.

The C-RNTI is used for controlling the PDSCH or the PUSCH on a single subframe. The SPS C-RNTI is used for periodically allocating a resource for the PDSCH or the PUSCH.

The base station apparatus 3 may transmit information indicating a configuration index I associated with a configuration for the monitoring of the DCI format 5 by the terminal device 1, to the terminal device 1 using the higher layer signal. Based on the information associated with the configuration for the monitoring of the DCI format 5 by the terminal device 1, the terminal device 1 may determine the subframe for monitoring the DCI format 5.

Moreover, for a certain terminal device 1, the configuration index I is common among multiple serving cells.

The configuration index I at least corresponds to periodicity T and an offset k (k is 0≤k<T). Based on the higher layer signal, the terminal device 1 sets a configuration index corresponding to the periodicity T and the offset k. The base station apparatus 3 may transmit the higher layer signal to the terminal device 1. That is, the terminal device 1 receives information associated with the configuration index using the higher layer signal, and may set the configuration index.

For example, the periodicity T may be selected from among {10, 20, 40, 80} ms. For example, the offset k is equal to or greater than 0, and is smaller than the periodicity T.

The terminal device 1 monitors the DCI format 5 that includes the third information which corresponds to each of at least one or more serving cells, on a subframe that satisfies $(10 \cdot n_f + n - k) \bmod T = 0$. $n_f = \{0, 1, \ldots, 1023\}$ is a radio frame index (System Frame Number (SFN)). $n = \{0, 1, \ldots, 9\}$ is a subframe index within the radio frame.

In a case where the DCI format 5 is detected on subframes $\{m \cdot T, m \cdot T+1, \ldots, (m+1) \cdot T-1\}$, a valid duration of the transmission direction UL-DL configuration that is indicated by the third information which is included in the DCI format 5 is subframes $\{m \cdot T, m \cdot T+1, \ldots, (m+1) \cdot T-1\}$ or subframes $\{(m+1) \cdot T, (m+1) \cdot T+1, \ldots, (m+2) \cdot T-1\}$. m is an integer that is equal to or greater than 0. During the valid duration, the terminal device 1 regards the transmission direction UL-DL configuration that is indicated by the third information, as being valid.

The subframes $\{m \cdot T, m \cdot T+1, \ldots, (m+1) \cdot T-1\}$, may be expressed as radio frames $\{m \cdot T/10, m \cdot T/10+1, \ldots, (m+1) \cdot T/10-1\}$. The subframes $\{(m+1) \cdot T, (m+1) \cdot T+1, \ldots, (m+2) \cdot T-1\}$ may be expressed as radio frames $\{(m+1) \cdot T/10, (m+1) \cdot T/10+1, \ldots, (m+2) \cdot T/10-1\}$.

In a case where the DCI format 5 is detected on the subframes $\{m \cdot T, m \cdot T+1, \ldots, (m+1) \cdot T-1\}$, the subframes $\{m \cdot T, m \cdot T+1, \ldots, (m+1) \cdot T-1\}$ may be referred to as Current subframes, Current radio frame(s), or Current duration.

In the case where the DCI format 5 is detected on the subframes $\{m \cdot T, m \cdot T+1, \ldots, (m+1) \cdot T-1\}$, the subframes $\{(m+1) \cdot T, (m+1) \cdot T+1, \ldots, (m+2) \cdot T-1\}$ may be referred to as Next subframes, Next radio frame(s), or Next duration.

In a case where multiple offsets k are set, the terminal device 1 may monitor the DCI format 5 on multiple subframes among the subframes $\{m \cdot T, m \cdot T+1, \ldots, (m+1) \cdot T-1\}$.

In a case where the DCI format 5 is detected on multiple subframes among the subframes $\{m \cdot T, m \cdot T+1, \ldots, (m+1) \cdot T-1\}$, the terminal device 1 may set the transmission direction UL-DL configuration based on the third information that is included in the DCI format 5 which is last detected on the subframes $\{m \cdot T, m \cdot T+1, \ldots, (m+1) \cdot T-1\}$.

Moreover, in a case where the offset k includes multiple values, the terminal device 1 may not expect to receive multiple DCI formats 5, or multiple DCI formats 5 that corresponds to the same cell, on the subframes $\{m \cdot T, m \cdot T+1, \ldots, (m+1) \cdot T-1\}$. That is, in a case where the offsets k include the multiple values and where the DCI format 5 is detected on one subframe among the subframes $\{m \cdot T, m \cdot T+1, \ldots, (m+1) \cdot T-1\}$, the terminal device 1 may not monitor the DCI format 5 on the remaining subframes to which the offset k corresponds. Furthermore, the terminal device 1 may not expect to receive multiple DCI formats 5 in which pieces of third information with different values (that is, pieces of third information indicating different transmission direction UL-DL configurations) are included, on the subframes $\{m \cdot T, m \cdot T+1, \ldots, (m+1) \cdot T-1\}$.

FIGS. 18 to 21 are diagrams illustrating one example of the configuration index for the monitoring the DCI format 5 including the third information according to the present embodiment. In FIG. 18, in a case where the configuration index I is 0, the periodicity T is 10 ms and where the offset k {0}, the valid duration in a case where the DCI format 5 is detected on the subframes $\{m \cdot T, m \cdot T+1, \ldots, (m+1) \cdot T-1\}$ is Current subframes.

It is preferable that in a case where the offset k includes a value smaller than a prescribed value, an initial duration is current subframes, and that in a case where the offset value k includes the same value as or a value greater than the prescribed value, the initial duration is Next subframes. For example, the prescribed value is 1, 2, or the like.

In FIG. 18, the prescribed value is 2. In FIG. 18, in a case where the offset k {0}, {1}, or {0, 1}, the valid duration is Current subframes, and in other cases, the valid duration is Next subframes.

That is, in FIG. 18, in a case where the DCI format 5 is detected on a subframe that corresponds to an offset k=0, whether or not the valid duration is Current subframes or Next subframes is determined based on the configuration index I. That is, whether the valid duration is Current subframe or Next subframes may be specified according to a subframe on which the DCI format 5 that is determined based on the configuration index I is monitored, regardless of a subframe on which the DCI format 5 is detected. That is, whether the valid duration is Current subframes or Next subframes may be specified based on the offset k (at least one value that is included in the offset k) that is determined based on the configuration index I.

For example, in FIG. 18, in a case where the configuration index is 0, and where the DCI format 5 is detected on the subframe corresponding to the offset k=0, the valid duration is Current subframes. Furthermore, in FIG. 18, in a case where the configuration index is 8 and where the DCI format 5 is detected on the subframe corresponding to the offset k=0, the valid duration is Next subframes.

Moreover, in a case where the offset k includes only a value smaller than a prescribed value, the valid duration may be Current subframes, and in a case where the offset k includes only the same as or a value greater than the prescribed value, the valid duration may be Next subframes. In this case, it is preferable that the offset k is defined in such a manner that a value smaller than the prescribed value and the same as or a value greater than the prescribed value are not included at the same time. Accordingly, whether or not the valid duration is Current subframes or Next subframes can be determined based on a value of the offset k to which the subframe on which the DCI format 5 is detected corresponds. For example, in a case where the prescribed value is 2, and where the DCI format 5 is detected on a subframe to which the offset k=0, 1 corresponds, the valid duration may be Current subframes. Furthermore, in a case where the prescribed value is 2, and where the DCI format 5 is detected on a subframe to which the offset k>1 corresponds, the valid duration may be Next subframes.

A first special configuration index I may be defined in which the offsets k are $\{0+10 \cdot j, 1+10 \cdot j, 5+10 \cdot j, 6+10 \cdot j\}$ (j=0, 1, \ldots, (T/10)−1) during multiple periodicities T, respectively.

That is, the first special configuration index I may be defined that corresponds to the offset k indicating each of the all the subframes that have the remainders 0, 1, 5 and 6 which results from performing division by 10, among the subframes $\{m \cdot T, m \cdot T+1, \ldots, (m+1) \cdot T-1\}$, during each of the multiple periodicities T.

The first special configuration index I may be defined that corresponds to the offset k indicating each of all the subframes that have subframe indexes 0, 1, 5, and 6 within the radio frame among the subframes $\{m \cdot T, m \cdot T+1, \ldots, (m+1) \cdot T-1\}$.

That is, the offset k to which the first special configuration index I corresponds may be all elements each of which has any of the remainders 0, 1, 5, and 6 that result from dividing each element of the subframes {m·T, m·T+1, . . . , (m+1)·T−1} by 10. The subframe that has the subframe index 0, 1, 5, or 6 within the radio frame is the downlink subframe or the spec subframe, and is a subframe on which the PDCCH can be always transmitted.

For example, in FIG. 18, a configuration index I=8 corresponds to a periodicity T=10 and an offset k={0, 1, 5, 6}. For example, in FIG. 18, a configuration index I=29 corresponds to a periodicity T=20 and an offset k={0, 1, 5, 6, 10, 11, 15, 16}. For example, in FIG. 19, a configuration index I=69 corresponds to a periodicity T=40 and an offset k={0, 1, 5, 6, 10, 11, 15, 16, 20, 21, 25, 26, 30, 31, 35, 36}. For example, in FIG. 21, a configuration index I=145 corresponds to a periodicity T=80 and an offset k={0, 1, 5, 6, 10, 11, 15, 16, 20, 21, 25, 26, 30, 31, 35, 36, 40, 41, 45, 46, 50, 51, 55, 56, 60, 61, 65, 66, 70, 71, 75, 76}. That is, in FIG. 18, the configuration index I=8, 29, 69, 145 is the first special configuration index I.

For each of the multiple periodicities T, the configuration index (the offset k) may be defined that corresponds to the monitoring of the DCI format 5 on all the subframes (all the subframes that are available for the transmission of the PDCCH) on which the PDCCH can be transmitted in the serving cell which monitors the DCI format 5, among the subframes {m·T, m·T+1, . . . , (m+1)·T−1}. The configuration index is referred to as a second special configuration index.

For example, in a case where the TDD is applied in the serving cell, all the subframes on which the PDCCH can be transmitted may be the DL subframe that is indicated with the UL reference UL-DL configuration and the special subframe that is indicated with the UL reference UL-DL configuration. That is, all the subframes on which the PDCCH can be transmitted may be the subframe that is indicated as the DL subframe or the special subframe by the UL reference UL-DL configuration.

The second special configuration index I (the offset k) may be defined that corresponds to the monitoring of the DCI format 5 on a DL subframe that is indicated with the UL reference UL-DL configuration and all the special subframes which are indicated with the UL reference UL-DL configuration, among the subframes {m·T, m·T+1, . . . , (m+1)·T−1}, during each of the multiple periodicities T. That is, based on a second special index I (the offset k), the terminal device 1 may monitor the DCI format 5 on all the subframe that are indicated as the DL subframe or the special subframe by the UL reference UL-DL configuration.

For example, in a case where the TDD is applied in the primary cell, all the subframes on which the PDCCH can be transmitted may be the DL subframe that is indicated with the UL reference UL-DL configuration of the primary cell and the special subframe that is indicated with the UL reference UL-DL configuration of the primary cell.

The second special configuration index I (the offset k) may be defined that corresponds to the monitoring of the DCI format 5 on the DL subframe that is indicated with the UL reference UL-DL configuration of the primary cell and all the special subframes which are indicated with the UL reference UL-DL configuration of the primary cell, among the subframes {m·T, m·T+1, . . . , (m+1)·T−1}, during each of the multiple periodicities T. That is, based on the second special index I (the offset k), the terminal device 1 may monitor the DCI format 5 on all the subframe that are indicated as the DL subframe or the special subframe by the UL reference UL-DL configuration of the primary cell.

That is, in a case where one primary cell is configured, and in a case where one primary cell and one secondary cell are configured and where the first UL reference UL-DL configuration for the primary cell and the first UL reference UL-DL configuration for the secondary cell are the same or in a case where one primary cell and one secondary cell are configured and where the TDD is applied in the primary cell and where the FDD is applied in the secondary cell, the second special configuration index I (the offset k) may be defined that corresponds to the monitoring of the DCI format 5 on the DL subframe that is indicated with the first UL reference UL-DL configuration of the primary cell and all the special subframes which are indicated with the first UL reference UL-DL configuration of the primary cell, among the subframes {m·T, m·T+1, . . . , (m+1)·T−1}, during each of the multiple periodicities T.

That is, in a case where one primary cell and one secondary cell are configured and where the first UL reference UL-DL configuration for the primary cell and the first UL reference UL-DL configuration for the secondary cell are different from each other, the second special configuration index I (the offset k) may be defined that corresponds to the monitoring of the DCI format 5 on the DL subframe that is indicated with the second UL reference UL-DL configuration of the primary cell and all the special subframes which are indicated with the second UL reference UL-DL configuration of the primary cell, among the subframes {m·T, m·T+1, . . . , (m+1)·T−1}, during each of the multiple periodicities T.

For example, in the case where the TDD is applied in the serving cell, all the subframes on which the PDCCH can be transmitted may be the DL subframe that is indicated with the DL reference UL-DL configuration and the special subframe that is indicated with the DL reference UL-DL configuration.

Furthermore, the second special configuration index I (the offset k) may be defined that corresponds to the monitoring of the DCI format 5 on a DL subframe that is indicated with the DL reference UL-DL configuration and all the special subframes which are indicated with the DL reference UL-DL configuration, among the subframes {m·T, m·T+1, . . . , (m+1)·T−1}, during each of the multiple periodicities T. That is, based on the second special index I (the offset k), the terminal device 1 may monitor the DCI format 5 on all the subframe that are indicated as the DL subframe or the special subframe by the DL reference UL-DL configuration.

For example, in the case where the TDD is applied in the primary cell, all the subframes on which the PDCCH can be transmitted may be the DL subframe that is indicated with the DL reference UL-DL configuration of the primary cell and the special subframe that is indicated with the DL reference UL-DL configuration of the primary cell.

The second special configuration index I (the offset k) may be defined that corresponds to the monitoring of the DCI format 5 on the DL subframe that is indicated with the DL reference UL-DL configuration of the primary cell and all the special subframes which are indicated with the DL reference UL-DL configuration of the primary cell, among the subframes {m·T, m·T+1, . . . , (m+1)·T−1}, during each of the multiple periodicities T. That is, based on the second special index I (the offset k), the terminal device 1 may monitor the DCI format 5 on all the subframe that are indicated as the DL subframe or the special subframe by the DL reference UL-DL configuration of the primary cell.

That is, in the case where one primary cell is configured, and in a case where one primary cell and one secondary cell are configured and where the first UL reference UL-DL configuration for the primary cell and the first UL reference UL-DL configuration for the secondary cell are the same or in the case where one primary cell and one secondary cell are configured and where the TDD is applied in the primary cell and where the FDD is applied in the secondary cell, the second special configuration index I (the offset k) may be defined that corresponds to the monitoring of the DCI format 5 on the DL subframe that is indicated with the first DL reference UL-DL configuration of the primary cell and all the special subframes which are indicated with the first DL reference UL-DL configuration of the primary cell, among the subframes {m·T, m·T+1, . . . , (m+1)·T−1}, during each of the multiple periodicities T.

That is, in a case where one primary cell and one secondary cell are configured and where the first DL reference UL-DL configuration for the primary cell and the first DL reference UL-DL configuration for the secondary cell are different from each other, the second special configuration index I (the offset k) may be defined that corresponds to the monitoring of the DCI format 5 on the DL subframe that is indicated with the second DL reference UL-DL configuration of the primary cell and all the special subframes which are indicated with the second DL reference UL-DL configuration of the primary cell, among the subframes {m·T, m·T+1, . . . , (m+1)·T−1}, during each of the multiple periodicities T.

Furthermore, in a case where one primary cell and one secondary cell are configured, where the FDD is applied in the primary cell, and where the TDD is applied in the secondary cell, all the subframes on which the PDCCH can be transmitted may be all the subframes of the primary cell.

That is, in a case where one primary cell and one secondary cell are configured, where the PDD is applied in the primary cell, and wherein the TDD is applied in the secondary cell, the second special configuration index I (the offset k) may be defined that corresponds to the monitoring of the DCI format 5 on all the subframes of the primary cell, among the subframes {m·T, m·T+1, . . . , (m+1)·T−1}, during each of the multiple periodicities T.

That is, the offset k to which the second special configuration index I corresponds is based on whether or not at least one secondary cell is configured. Furthermore, the offset k to which the second special configuration index I corresponds is based on which of the TDD and the FDD is applied in the primary cell. Furthermore, the offset k to which the second special configuration index I corresponds is based on the UL reference UL-DL configuration of the primary cell or the DL reference UL-DL configuration of the primary cell. Furthermore, the offset k to which the second special configuration index I corresponds is based on which of the TDD and the FDD is applied in the primary cell.

Moreover, the offset k may be based on a bitmap.

FIG. 22 is a diagram illustrating one example of the periodicity T and the offset k according to the present embodiment.

In FIG. 22, one primary cell (S1) and one secondary cell (S2) are configured for the terminal device 1. In FIG. 22, S10 is the third information that is transmitted on the CSS of the primary cell (S1) on a subframe that satisfies $(10 \cdot n_f + n - k) \bmod T = 0$.

In FIG. 22, the transmission direction UL-DL configuration that is indicated by the third information for the primary cell (S1), which is included in the DCI format 5 that is detected on certain subframes {m·T, m·T+1, . . . , (m+1)·T−1} is valid on next subframes {(m+1)·T, (m+1)·T+1, . . . , (m+2)·T−1}.

In FIG. 22, the transmission direction UL-DL configuration that is indicated by the third information for the secondary cell (S2), which is included in the DCI format 5 that is detected on certain subframes {m·T, m·T+1, . . . , (m+1)·T−1} is valid on next subframes {(m+1)·T, (m+1)·T+1, . . . , (m+2)·T−1}.

That is, the transmission direction UL-DL configuration that is indicated by the third information for each of the multiple serving cells, which is included in the same DCI format 5 is valid for the same duration.

Moreover, a cell group i that is constituted from at least one serving cell may be configured. The base station apparatus 3 may configure a cell group index of the cell group. The base station apparatus 3 may transmit information indicating the cell group index to the terminal device 1.

The cell group index of the cell group including the primary cell may be always 0. The base station apparatus 3 may configure the cell group index of the cell group that is constituted from only the secondary cells. The base station apparatus 3 may configure the cell group index of the cell group that is constituted from only the secondary cells.

Moreover, for a certain terminal device 1, the configuration index I may be common among multiple cell groups. Based on the higher layer signal, the terminal device 1 may set a configuration index $I_i$ that corresponds to a periodicity $T_i$ and an offset k for each of the cell groups i. The base station apparatus 3 may transmit the higher layer signal to the terminal device 1.

In the cell group in which the primary cell is included, a cell that monitors the third information may be always the primary cell. The terminal device 1 may set ServCellIndex of the cell that monitors the third information (the DCI format 5) which corresponds to the cell group, for each of the cell groups each of which is constituted from only the secondary cells, based on the higher layer signal. The base station apparatus 3 may transmit the higher layer signal to the terminal device 1.

FIG. 23 is a diagram illustrating one example of a configuration of a correspondence between the cell group index and ServCellIndex, and the index of the third information according to the present embodiment.

In FIG. 23, a cell group with a cell group index 0 is configured for the terminal device 1A. In FIG. 23, the cell group with the cell group index 0 and a cell group with a cell group index 1 are configured for the terminal device 1B.

In FIG. 23, ServCellIndex of the cell that monitors the third information (the DCI format 5) which corresponds to the cell group index 0 for the terminal device 1A is 0. In FIG. 23, ServCellIndex of the cell that monitors the third information (the DCI format 5) which corresponds to the cell group index 0 for the terminal device 1B is 0. In FIG. 23, ServCellIndex of the cell that monitors the third information (the DCI format 5) which corresponds to the cell group index 1 for the terminal device 1B is 3.

Figure 24:
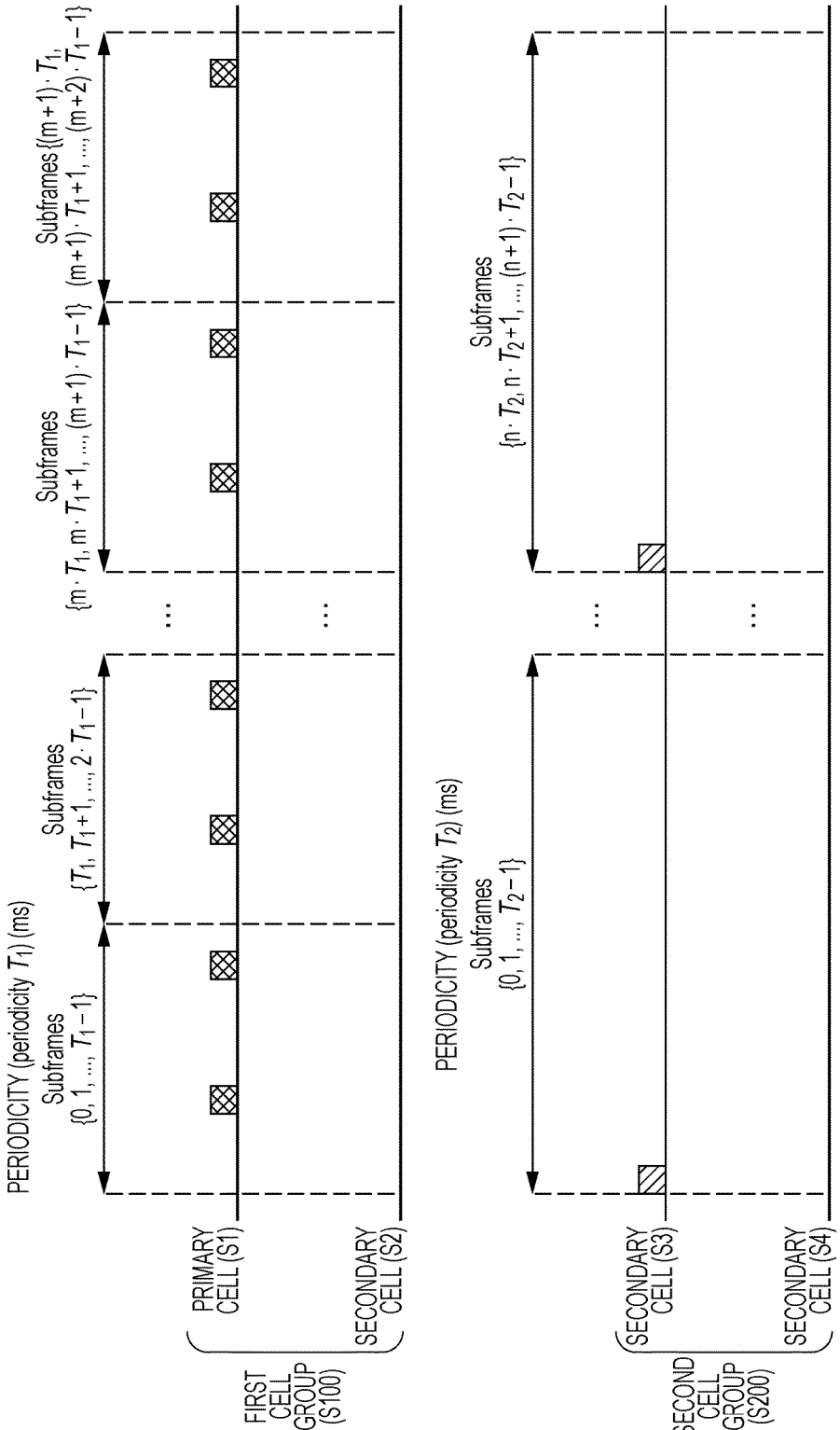
FIG. 24 is a diagram illustrating one example of the periodicity T and the offset k for each of the cell groups according to the present embodiment.

FIG. 24 is a diagram illustrating one example of the periodicity T and the offset k for each of the cell groups according to the present embodiment.

In FIG. 24, one primary cell (S1) and three secondary cells (S2, S3, and S4) are configured for the terminal device 1. In FIG. 24, a first cell group (S100) is constituted from one primary cell (S1) and one secondary cell (S2). In FIG. 24, a second cell group (S200) is constituted from two secondary cells (S3 and S4).

In FIG. 24, S10 is the third information (the DCI format 5) that is transmitted on the CSS of the primary cell (S1) on a subframe that satisfies $(10 \cdot n_f + n - k_1) \bmod T_1 = 0$, and corresponds to the first cell group. In FIG. 24, S20 is the third information (the DCI format 5) that is transmitted on the CSS of the secondary cell (S3) on a subframe that satisfies $(10 \cdot n_f + n - k_2) \bmod T_2 = 0$, and corresponds to the second cell group.

In FIG. 24, the transmission direction UL-DL configuration that is indicated by the third information for the primary cell (S1), which is included in the DCI format 5 that is detected on certain subframes $\{m \cdot T, m \cdot T+1, \ldots, (m+1) \cdot T-1\}$ is valid on next subframes $\{(m+1) \cdot T, (m+1) \cdot T+1, \ldots, (m+2) \cdot T-1\}$.

In FIG. 24, the transmission direction UL-DL configuration that is indicated by the third information for the secondary cell (S2), which is included in the DCI format 5 that is detected on certain subframes $\{m \cdot T, m \cdot T+1, \ldots, (m+1) \cdot T-1\}$ is valid on next subframes $\{(m+1) \cdot T, (m+1) \cdot T+1, \ldots, (m+2) \cdot T-1\}$.

In FIG. 24, the transmission direction UL-DL configuration that is indicated by the third information for the secondary cell (S3), which is included in the DCI format 5 that is detected on certain subframes $\{n \cdot T, n \cdot T+1, \ldots, (n+1) \cdot T-1\}$ is valid on next subframes $\{(n+1) \cdot T, (n+1) \cdot T+1, \ldots, (n+2) \cdot T-1\}$.

In FIG. 24, the transmission direction UL-DL configuration that is indicated by the third information for the secondary cell (S4), which is included in the DCI format 5 that is detected on certain subframes $\{n \cdot T, n \cdot T+1, \ldots, (n+1) \cdot T-1\}$ is valid on next subframes $\{(n+1) \cdot T, (n+1) \cdot T+1, \ldots, (n+2) \cdot T-1\}$.

That is, the transmission direction UL-DL configuration that is indicated by the third information for each of the multiple serving cells, which is included in the same DCI format 5 is valid for the same duration.

That is, the third information that corresponds to a different cell group is included in a different DCI format 5. Furthermore, the third information that corresponds to each of the multiple serving cells that are included in the same cell group is included in the same DCI format 5. Furthermore, the duration for which the transmission direction UL-DL configuration that is indicated by the third information is valid is defined for every cell group.

The transmission direction UL-DL configuration will be described below.

The terminal device 1 and the base station apparatus 3 set the transmission direction UL-DL configuration associated with transmission direction (uplink/downlink) on a subframe. The transmission direction UL-DL configuration is used for determining the transmission direction on the subframe.

The terminal device 1 may control the transmission on the first flexible subframe and the second flexible subframe based on the scheduling information (the DCI format and/or the HARQ-ACK) and the transmission direction UL-DL configuration.

The base station apparatus 3 transmits the third information that indicates the transmission direction UL-DL configuration to the terminal device 1. The third information is information that indicates a subframe which is available for the uplink transmission. The third information is information that indicates a subframe which is available for the downlink transmission. The third information is information that indicates a subframe which is available for the CSI measurement (interference measurement) for the downlink. The third information is information that indicates a subframe which is available for the uplink transmission on the UpPTS and for the downlink transmission on the DwPTS. The transmission direction UL-DL configuration is used for specifying the transmission direction on the subframe that is indicated as a subframe that differs between the first UL reference UL-DL configuration and the first DL reference UL-DL configuration.

The base station apparatus 3 may perform scheduling of the downlink transmission on the subframe that is indicated as the downlink subframe by the transmission direction UL-DL configuration.

In a case where the third information (the DCI format 5) can be correctly detected, the terminal device 1 may perform reception processing of the downlink signal on the subframe that is indicated as the downlink subframe by the transmission direction UL-DL configuration which is indicated by the detected third information, among the subframes $\{m \cdot T, m \cdot T+1, \ldots, (m+1) \cdot T-1\}$ to which the detected third information corresponds.

In a case where the third information (the DCI format 5) that corresponds to the subframes $\{m \cdot T, m \cdot T+1, \ldots, (m+1) \cdot T-1\}$ cannot be correctly detected, the terminal device 1 may perform the reception processing of the downlink subframe on the subframe that is indicated as the downlink subframe by the UL reference UL-DL configuration, among the subframes $\{m \cdot T, m \cdot T+1, \ldots, (m+1) \cdot T-1\}$.

In the case where the third information (the DCI format 5) that corresponds to the subframes $\{m \cdot T, m \cdot T+1, \ldots, (m+1) \cdot T-1\}$ cannot be correctly detected, the terminal device 1 may perform the reception processing of the downlink subframe on the subframe that is indicated as the downlink subframe by the DL reference UL-DL configuration, among the subframes $\{m \cdot T, m \cdot T+1, \ldots, (m+1) \cdot T-1\}$.

The base station apparatus 3 may perform transmission of the PDCCH/EPDCCH on the subframe that is indicated as the downlink subframe by the transmission direction UL-DL configuration.

In the case where the third information (the DCI format 5) can be correctly detected, the terminal device 1 may perform monitoring of the PDCCH/EPDCCH that is accompanied by the downlink assignment and/or the uplink grant on the subframe that is indicated as the downlink subframe by the transmission direction UL-DL configuration which is indicated by the detected third information, among the subframes $\{m \cdot T, m \cdot T+1, \ldots, (m+1) \cdot T-1\}$ to which the detected third information corresponds.

In the case where the third information (the DCI format 5) that corresponds to the subframes $\{m \cdot T, m \cdot T+1, \ldots, (m+1) \cdot T-1\}$ cannot be correctly detected, the terminal device 1 may perform the monitoring of the PDCCH/EPDCCH that is accompanied by the downlink assignment and/or the uplink grant, on the subframe that is indicated as the downlink subframe by the UL reference UL-DL configuration, among the subframes $\{m \cdot T, m \cdot T+1, \ldots, (m+1) \cdot T-1\}$.

In the case where the third information (the DCI format 5) that corresponds to the subframes $\{m \cdot T, m \cdot T+1, \ldots, (m+1) \cdot T-1\}$ cannot be correctly detected, the terminal device 1 may perform the monitoring of the PDCCH/EPDCCH that is accompanied by the downlink assignment and/or the uplink grant, on the subframe that is indicated as the downlink subframe by the DL reference UL-DL configuration, among the subframes $\{m \cdot T, m \cdot T+1, \ldots, (m+1) \cdot T-1\}$.

The base station apparatus 3 may perform the CSI measurement (the interference measurement) on the subframe that is indicated as the downlink subframe by the transmission direction UL-DL configuration.

In the case where the third information (the DCI format 5) can be correctly detected, the terminal device 1 may perform the CSI measurement (the interference measurement) on the subframe that is indicated as the downlink subframe by the transmission direction UL-DL configuration which is indicated by the detected third information, among the subframes {m·T, m·T+1, ..., (m+1)·T−1} to which the detected third information corresponds.

In the case where the third information (the DCI format 5) that corresponds to the subframes {m·T, m·T+1, ..., (m+1)·T−1} cannot be correctly detected, the terminal device 1 may perform the CSI measurement (the interference measurement) on the subframe that is indicated as the downlink subframe by the UL reference UL-DL configuration, among the subframes {m·T, m·T+1, ..., (m+1)·T−1}.

In the case where the third information (the DCI format 5) that corresponds to the subframes {m·T, m·T+1, ..., (m+1)·T−1} cannot be correctly detected, the terminal device 1 may perform the CSI measurement (the interference measurement) on the subframe that is indicated as the downlink subframe by the DL reference UL-DL configuration, among the subframes {m·T, m·T+1, ..., (m+1)·T−1}.

The base station apparatus 3 does not perform the scheduling of the uplink transmission on the subframe that is indicated as the downlink subframe by the transmission direction UL-DL configuration.

In the case where the third information (the DCI format 5) can be correctly detected, for example, although the uplink transmission is scheduled, the terminal device 1 does not perform the uplink transmission on the subframe that is indicated as the downlink subframe by the transmission direction UL-DL configuration which is indicated by the detected third information, among the subframes {m·T, m·T+1, (m+1)·T−1} to which the detected third information corresponds.

In the case where the third information (the DCI format 5) that corresponds to the subframes {m·T, m·T+1, ..., (m+1)·T−1} cannot be correctly detected, for example, although the uplink transmission is scheduled, the terminal device 1 does not perform the uplink transmission on the subframe that is indicated as the downlink subframe by the UL reference UL-DL configuration, among the subframes {m·T, m·T+1, ..., (m+1)·T−1}.

In the case where the third information (the DCI format 5) that corresponds to the subframes {m·T, m·T+1, ..., (m+1)·T−1} cannot be correctly detected, for example, although the uplink transmission is scheduled, the terminal device 1 does not perform the uplink transmission on the subframe that is indicated as the downlink subframe by the DL reference UL-DL configuration, among the subframes {m·T, m·T+1, ..., (m+1)·T−1}.

The base station apparatus 3 may perform the scheduling of the uplink transmission on the subframe that is indicated as the uplink subframe by the transmission direction UL-DL configuration.

In the case where the third information (the DCI format 5) can be correctly detected, the terminal device 1 may perform transmission processing of the uplink signal on the subframe that is indicated as the uplink subframe by the transmission direction UL-DL configuration which is indicated by the detected third information, among the subframes {m·T, m·T+1, ..., (m+1)·T−1} to which the detected third information corresponds.

In the case where the third information (the DCI format 5) that corresponds to the subframes {m·T, m·T+1, ..., (m+1)·T−1} cannot be correctly detected, the terminal device 1 may perform the transmission processing of the uplink subframe on the subframe that is indicated as the uplink subframe by the UL reference UL-DL configuration, among the subframes {m·T, m·T+1, ..., (m+1)·T−1}.

In the case where the third information (the DCI format 5) that corresponds to the subframes {m·T, m·T+1, ..., (m+1)·T−1} cannot be correctly detected, the terminal device 1 may perform the transmission processing of the uplink subframe on the subframe that is indicated as the uplink subframe by the DL reference UL-DL configuration, among the subframes {m·T, m·T+1, ..., (m+1)·T−1}.

The base station apparatus 3 may perform the scheduling of the downlink transmission on the DwPTS of the subframe that is indicated as the special subframe by the transmission direction UL-DL configuration.

In the case where the third information (the DCI format 5) can be correctly detected, the terminal device 1 may perform the reception processing of the downlink signal on the DwPTS of the subframe that is indicated as the special subframe by the transmission direction UL-DL configuration which is indicated by the detected third information, among the subframes {m·T, m·T+1, ..., (m+1)·T−1} to which the detected third information corresponds.

In the case where the third information (the DCI format 5) that corresponds to the subframes {m·T, m·T+1, ..., (m+1)·T−1} cannot be correctly detected, the terminal device 1 may perform the reception processing of the downlink subframe on the DwPTS of the subframe that is indicated as the special subframe by the UL reference UL-DL configuration, among the subframes {m·T, m·T+1, ..., (m+1)·T−1}.

In the case where the third information (the DCI format 5) that corresponds to the subframes {m·T, m·T+1, ..., (m+1)·T−1} cannot be correctly detected, the terminal device 1 may perform the reception processing of the downlink subframe on the DwPTS of the subframe that is indicated as the special subframe by the DL reference UL-DL configuration, among the subframes {m·T, m·T+1, ..., (m+1)·T−1}.

The base station apparatus 3 may perform the scheduling of the transmission of the SRS on the UpPTS of the subframe that is indicated as the special subframe by the transmission direction UL-DL configuration.

In the case where the third information (the DCI format 5) can be correctly detected, the terminal device 1 may perform transmission processing of the SRS on the UpPTS of the subframe that is indicated as the special subframe by the transmission direction UL-DL configuration which is indicated by the detected third information, among the subframes {m·T, m·T+1, ..., (m+1)·T−1} to which the detected third information corresponds.

In the case where the third information (the DCI format 5) that corresponds to the subframes {m·T, m·T+1, ..., (m+1)·T−1} cannot be correctly detected, the terminal device 1 may perform the transmission processing of the SRS on the UpPTS of the subframe that is indicated as the special subframe by the UL reference UL-DL configuration, among the subframes {m·T, m·T+1, ..., (m+1)·T−1}.

In the case where the third information (the DCI format 5) that corresponds to the subframes {m·T, m·T+1, ..., (m+1)·T−1} cannot be correctly detected, the terminal device 1 may perform the transmission processing of the SRS on the UpPTS of the subframe that is indicated as the special subframe by the DL reference UL-DL configuration, among the subframes {m·T, m·T+1, ..., (m+1)·T−1}.

A configuration of a device according to the present embodiment will be described below.

Figure 25:
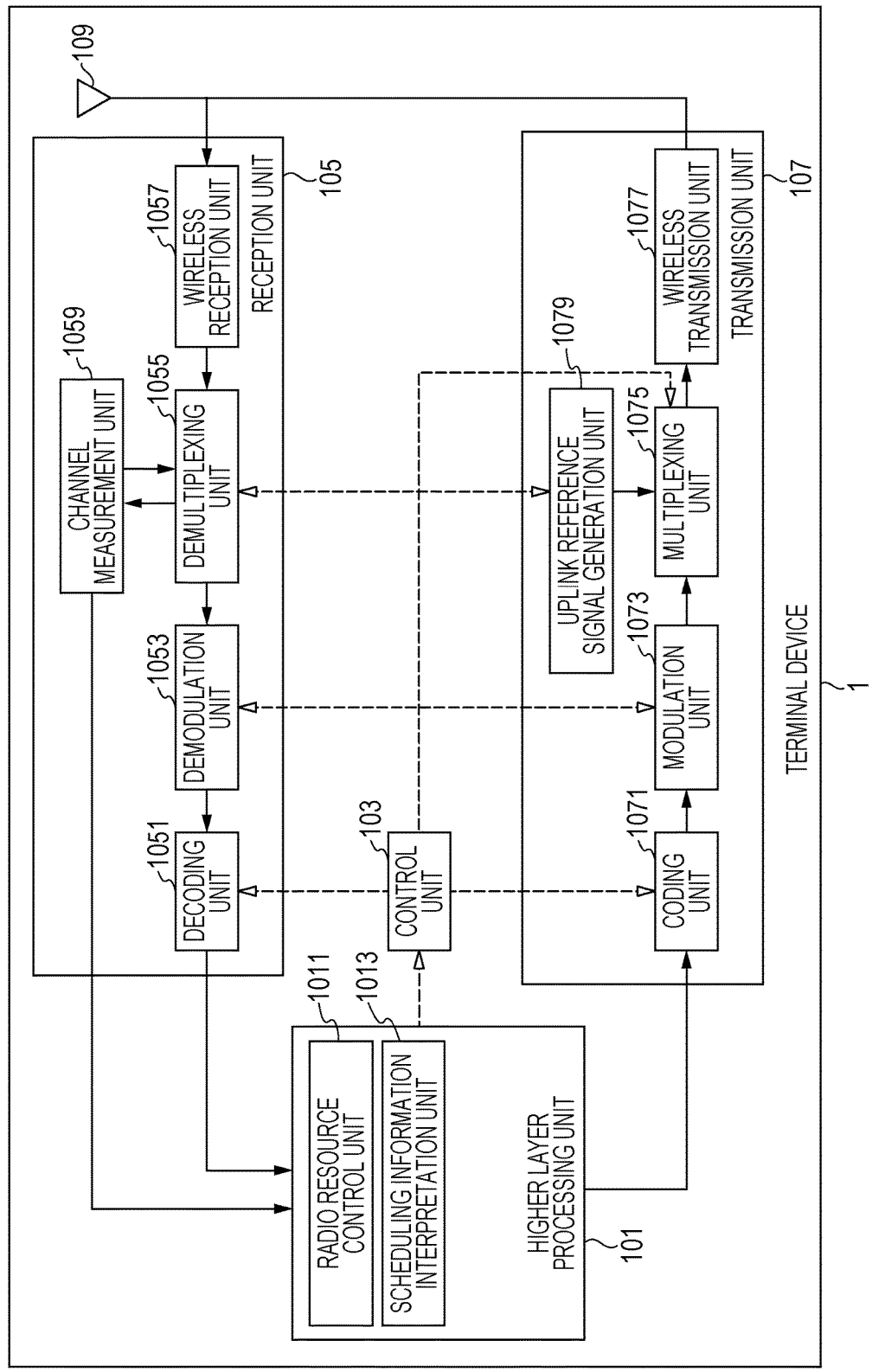
FIG. 25 is a schematic block diagram illustrating a configuration of a terminal device 1 according to the present embodiment.

FIG. 25 is a schematic block diagram illustrating a configuration of the terminal device 1 according to the present embodiment. As illustrated, the terminal device 1 is constituted to include a higher layer processing unit 101, a control unit 103, a reception unit 105, a transmission unit 107, and a transmit and receive antenna unit 109. Furthermore, the higher layer processing unit 101 is constituted to include a radio resource control unit (a configuration unit) 1011, and a scheduling information interpretation unit 1013. Furthermore, the reception unit 105 is constituted to include a decoding unit 1051, a demodulation unit 1053, a demultiplexing unit 1055, a wireless reception unit 1057, and a channel measurement unit 1059. Furthermore, the transmission unit 107 is constituted to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) that is generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that is included in the higher layer processing unit 101 manages various pieces of configuration information of the terminal device 1 itself or various parameters for the terminal device 1. The radio resource control unit 1011 sets various pieces of configuration information/parameters based on the higher layer signal that is received from the base station apparatus 3. That is, the radio resource control unit 1011 sets various pieces of configuration information/parameters based on pieces of information indicating various pieces of configuration information/parameters that are received from the base station apparatus 3. Furthermore, the radio resource control unit 1011 generates information that is arranged in each uplink channel and outputs the generated information to the transmission unit 107. The radio resource control unit 1011 is referred to as a configuration unit 1011.

The scheduling information interpretation unit 1013 that is included in the higher layer processing unit 101 interprets the DCI format (scheduling information) that is received through the reception unit 105, generates control information for performing control of the reception unit 105 and the transmission unit 107 based on a result of interpreting the DCI format, and outputs the generated control information to the control unit 103.

The control unit 103 generates a control signal for performing the control of the reception unit 105 and the transmission unit 107, based on the control information from the higher layer processing unit 101. The control unit 103 outputs the generated control signal to the reception unit 105 and the transmission unit 107 and performs the control of the reception unit 105 and the transmission unit 107.

In accordance with the control signal that is input from the control unit 103, the reception unit 105 demultiplexes, demodulates, and decodes a reception signal that is received from the base station apparatus 3 through the transmit and receive antenna unit 109, and outputs the resulting information to the higher layer processing unit 101.

The wireless reception unit 1057 converts (down-converts) a downlink signal that is received through the transmit and receive antenna unit 109 into a signal in a baseband by performing orthogonal demodulation, removes a unnecessary frequency component, controls an amplification level in such a manner as to suitably maintain a signal level, performs orthogonal demodulation based on an in-phase component and an orthogonal component of the received signal, and converts the analog signal that results from the orthogonal demodulation, into a digital signal. The wireless reception unit 1057 removes a portion that is equivalent to a Cyclic Prefix (CP) from the digital signal that results from the conversion, performs Fast Fourier Transform (FFT) on the signal from which the CP is removed, and extracts a signal in the frequency domain.

The demultiplexing unit 1055 demultiplexes the extracted signal that result from the extraction, into the PHICH, the PDCCH, the EPDCCH, the PDSCH, and the downlink reference signal. Furthermore, the demultiplexing unit 1055 makes an adjustment of channels, that is, the PHICH, the PDCCH, the EPDCCH, and the PDSCH, using a channel estimate that is input from the channel measurement unit 1059. Furthermore, the demultiplexing unit 1055 outputs a downlink reference signal that results from the multiplexing to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs a HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 attempts to perform the decoding of the PDCCH and/or the EPDCCH. In a case where the decoding unit 1051 succeeds in the decoding, the decoding unit 1051 outputs downlink control information that results from the decoding and an RNTI to which the downlink control information corresponds, to the higher layer processing unit 101.

The demodulation unit 1053 performs the demodulation on the PDSCH in compliance with the modulation scheme that is notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs decoding based on information associated with a coding rate that is notified with the downlink control information, and outputs downlink data (a transport block) that results from the decoding, to the higher layer processing unit 101.

The channel measurement unit 1059 measures a downlink path loss or a channel state from the downlink reference signal that is input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 measures channel measurement and/or interference measurement in order to calculate a CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station apparatus 3 through the transmit and receive antenna unit 109.

The coding unit 1071 performs the coding, such as convolutional coding and block coding, on the uplink control information that is input from the higher layer processing unit 101. Furthermore, the coding unit 1071 performs turbo coding, based on information that is used for the scheduling of the PUSCH.

The modulation unit 1073 performs the modulation on coded bits, which are input from the coding unit 1071, in compliance with the modulation scheme that is notified with the downlink control information, such as the BPSK, the QPSK, the 16 QAM, or the 64 QAM, or in compliance with a modulation scheme that is prescribed in advance for every channel Based on the information that is used for the scheduling of the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an equation) that is prescribed in advance, based on a physical layer cell identifier (which is also referred to as a physical layer cell identity (PCI), a Cell Id., or the like) for identifying the base station apparatus 3, a bandwidth to which the uplink reference signal is mapped, a cyclic shift that is notified with the uplink grant, a value of a parameter for generation of a DMRS sequence, and the like. In accordance with the control signal that is input from the control unit 103, the multiplexing unit 1075 rearranges modulation symbols of the PUSCH in parallel and then performs Discrete Fourier Transform (DFT) on the resulting modulation symbols. Furthermore, the multiplexing unit 1075 multiplexes PUCCH and PUSCH signals and the generated uplink reference signal for every transmit antenna port. More precisely, the multiplexing unit 1075 maps the PUCCH and PUSCH signals and the generated uplink reference signal to the resource elements for every transmit antenna port.

The wireless transmission unit 1077 performs Inverse Fast Fourier Transform (IFFT) on a signal that results from the multiplexing, generates an SC-FDMA symbol, attaches a CP to the generated SC-FDMA symbol, generates a digital signal in a baseband, converts the digital signal in the baseband in an analog signal, removes a superfluous frequency component using a low pass filter, performs up-converting into a carrier frequency, performs power amplification, and outputs a final result to the transmit and receive antenna unit 109 for transmission.

Figure 26:
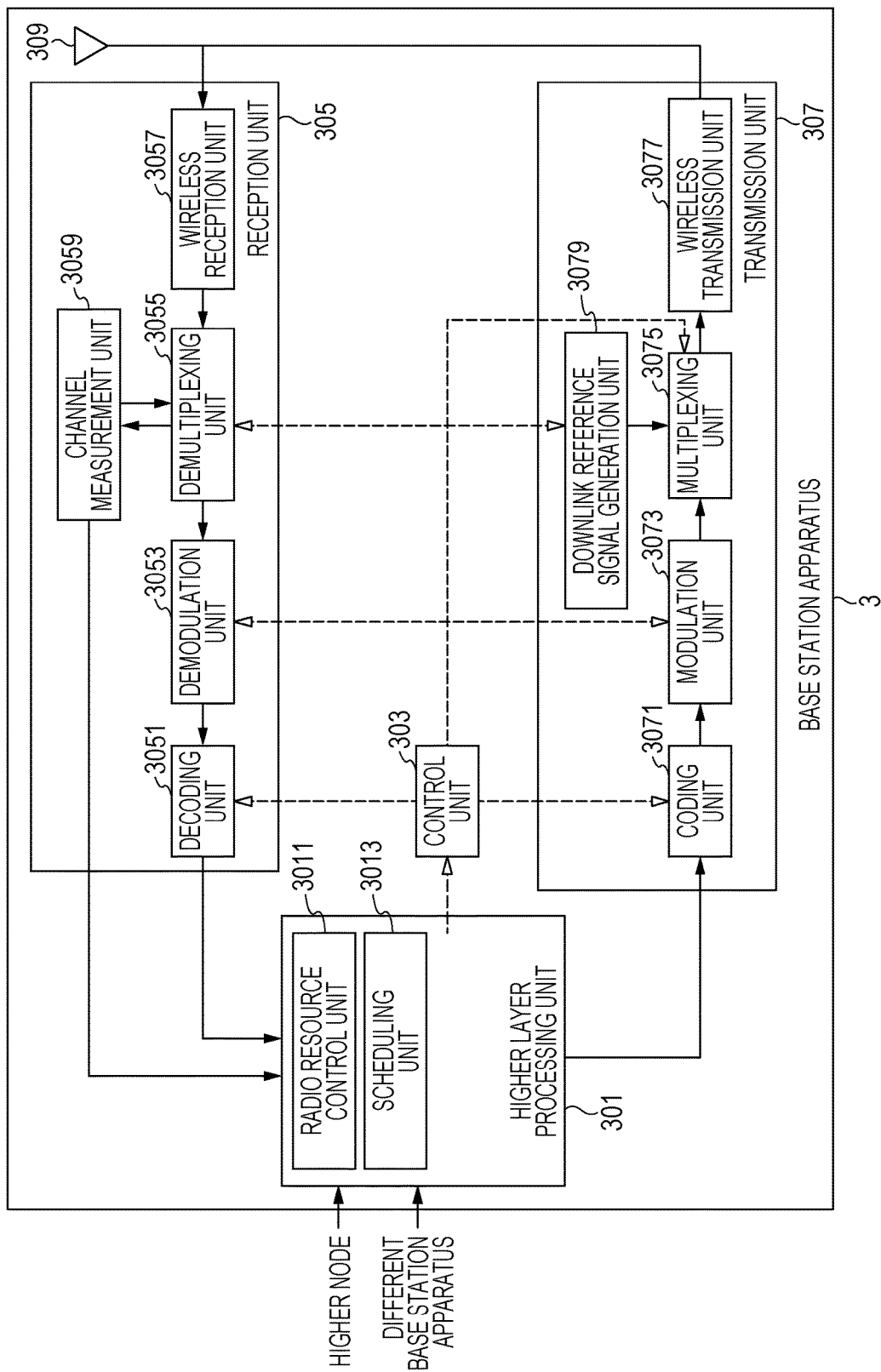
FIG. 26 is a schematic block diagram illustrating a configuration of a base station apparatus 3 according to the present embodiment.

FIG. 26 is a schematic block diagram illustrating a configuration of the base station apparatus 3 according to the present embodiment. As illustrated, the base station apparatus 3 is constituted to include a higher layer processing unit 301, a control unit 303, a reception unit 305, a transmission unit 307, and a transmit and receive antenna unit 309. Furthermore, the higher layer processing unit 301 is constituted to include a radio resource control unit 3011 and a scheduling unit 3013. Furthermore, the reception unit 305 is constituted to include a decoding unit 3051, a demodulation unit 3053, a demultiplexing unit 3055, a wireless reception unit 3057, and a channel measurement unit 3059. Furthermore, the transmission unit 307 is constituted to include a coding unit 3071, a modulation unit 3073, a multiplexing unit 3075, a wireless transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is arrange in the downlink PDSCH, the system information, the RRC message, the MAC Control Element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 3011 may set various pieces of configuration information/parameters for each of the terminal devices 1 through the higher layer signal. That is, the radio resource control unit 1011 transmits and broadcasts pieces of information indicating various pieces of configuration information/parameters. The radio resource control unit 3011 is referred to as a configuration unit 3011.

The scheduling unit 3013 that is included in the higher layer processing unit 301 determines a frequency and a subframe to which the physical channel (the PDSCH and the PUSCH) is allocated, the coding rate and modulation scheme for the physical channel (the PDSCH and the PUSCH), the transmission power, and the like, from the received channel estimate information and from the channel estimate, channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. The scheduling unit 3013 determines a timing when transmission processing and reception processing are performed.

The control unit 303 generates a control signal for performing the control of the reception unit 305 and the transmission unit 307, based on the control information from the higher layer processing unit 301. The control unit 303 outputs the generated control signal to the reception unit 305 and the transmission unit 307 and performs the control of the reception unit 305 and the transmission unit 307.

In accordance with the control signal that is input from the control unit 303, the reception unit 305 demultiplexes, demodulates, and decodes the reception signal that is received from the terminal device 1 through the transmit and receive antenna unit 309, and outputs information that results from the decoding, to the higher layer processing unit 301. The wireless reception unit 3057 converts (down-converts) an uplink signal that is received through the transmit and receive antenna unit 309 into a signal in a baseband by performing orthogonal demodulation, removes a unnecessary frequency component, controls an amplification level in such a manner as to suitably maintain a signal level, performs orthogonal demodulation based on an in-phase component and an orthogonal component of the received signal, and converts the analog signal that results from the orthogonal demodulation, into a digital signal.

The wireless reception unit 3057 removes a portion that is equivalent to a Cyclic Prefix (CP) from a digital signal that results from the conversion. The wireless reception unit 3057 performs the Fast Fourier Transform (FFT) on the signal from which the CP is removed, and outputs the resulting signal to the demultiplexing unit 3055 that extracts the signal in the frequency domain.

The demultiplexing unit 1055 demultiplexes the signal that is input from the wireless reception unit 3057, into the PUCCH, the PUSCH, the uplink reference signal, and the like. Moreover, the demultiplexing is performed based on radio resource allocation information that is determined in advance by the base station apparatus 3, using the radio resource control unit 3011, and that is included in the uplink grant notified to each of the terminal devices 1. Furthermore, the demultiplexing unit 3055 makes an adjustment of channels, that is, the PUCCH and the PUSCH, using the channel estimate that is input from the channel measurement unit 3059. Furthermore, the demultiplexing unit 3055 outputs an uplink reference signal that results from the demultiplexing, to the channel measurement unit 3059.

The demodulation unit 3053 performs Inverse Discrete Fourier Transform (IDFT) on the PUSCH, acquires the modulation symbol, and performs reception signal demodulation on each of the modulation symbols of the PUCCH and the PUSCH, using the modulation scheme that is prescribed in advance, such as the Binary Phase Shift Keying (BPSK), the QPSK, the 16 QAM, or the 64 QAM, or using the modulation scheme that is notified, in advance with the uplink grant, to each of the terminal devices 1 by the base station apparatus 3 itself. The demodulation unit 3053 demultiplexes the modulation symbols of the multiple pieces of uplink data that are transmitted on the same PUSCH by using the MIMO SM, based on the number of space-multiplexed sequences that is notified in advance with the uplink grant to each of the terminal devices 1 and on information indicating the precoding that is performed on the sequences.

The decoding unit 3051 performs the decoding on the coded bits of the PUCCH and the PUSCH that results from the demodulation, at the coding rate in compliance with a coding scheme prescribed in advance, which is prescribed in advance, or which is notified in advance with the uplink grant to the terminal device 1 by the base station apparatus 3 itself, and outputs the uplink data and the uplink control information that result from the decoding, to the higher layer processing unit 101. In a case where the PUSCH is re-transmitted, the decoding unit 3051 performs the decoding using the coded bits that are input from the higher layer processing unit 301 and that are retained in a HARQ buffer, and the coded bits that results from the demodulation. The channel measurement unit 309 measures the channel estimate, the channel quality, and the like, from the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits the resulting signal to the terminal device 1 through the transmit and receive antenna unit 309.

The coding unit 3071 performs the coding on the HARQ indicator, the downlink control information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as the BPSK, the QPSK, the 16 QAM, or the 64 QAM, or using the modulation scheme that is determined by the radio resource control unit 3011.

The downlink reference signal generation unit 3079 generates as the downlink reference signal a sequence that is already known to the terminal device 1 and that is acquired according to a rule that is prescribed in advance based on the physical layer cell identifier (PCI) for identifying the base station apparatus 3, and the like. The multiplexing unit 3075 multiplexes a modulation symbol of each channel, which results from the modulation, and the generated downlink reference signal. More precisely, the multiplexing unit 3075 maps a modulation symbol of each channel, which results from the modulation, and the generated downlink reference signal, to resource elements.

The wireless transmission unit 3077 performs the Inverse Fast Fourier Transform (IFFT) on a modulation symbol and the like that result from the multiplexing, generates an OFDM symbol, attaches a CP to the generated OFDM symbol, generates a digital signal in a baseband, converts the digital signal in the baseband in an analog signal, removes a superfluous frequency component using a low pass filter, performs up-converting into a carrier frequency, performs power amplification, and outputs a final result to the transmit and receive antenna unit 309 for transmission.

More specifically, a terminal device 1 according to the present embodiment includes a configuration unit 1011 that sets a first UL-DL configuration based on a first signal of a higher layer, and that sets a configuration index that corresponds to a periodicity T and an offset k, based on a second signal of the higher layer, and a reception unit 105 that monitors a DCI format 5 which includes information indicating a second UL-DL configuration, on a subframe that satisfies $(10 \cdot n_f + n - k) \mod T = 0$, in which the $n_f$ may be a radio frame index (SFN), the n may be a subframe index within a radio frame, a valid duration of the second UL-DL configuration that is indicated by the information indicating the second UL-DL configuration which is included in the DCI format 5 that is detected on subframes $\{m \cdot T, m \cdot T+1, \ldots, (m+1) \cdot T-1\}$ may be the subframes $\{m \cdot T, m \cdot T+1, \ldots, (m+1) \cdot T-1\}$ or subframes $\{(m+1) \cdot T, (m+1) \cdot T+1, \ldots, (m+2) \cdot T-1\}$, the valid duration may be the subframes $\{m \cdot T, m \cdot T+1, \ldots, (m+1) \cdot T-1\}$ in a case where the configuration index is a first value, and the valid duration may be the subframes $\{(m+1) \cdot T, (m+1) \cdot T+1, \ldots, (m+2) \cdot T-1\}$ in a case where the configuration index is a second value.

The first UL-DL configuration is the UL reference UL-DL configuration or the DL reference UL-DL configuration.

Moreover, in a case where the configuration index is the first value, the offset k is both of 0 and 1, or either of 0 and 1, and in a case where the configuration index is the second value, the offset k at least includes a value that is equal to 2 or is greater than 2.

Moreover, in the case where the configuration index is the first value, the offset k may at least include both of 0 and 1, or either of 0 and 1, and in the case where the configuration index is the second value, the offset k may not at least include 0 and 1.

In a case where the configuration index is a third value, the periodicity T is a first periodicity, the offset k is {0+10·(j−1), 1+10·(j−1), 5+10·(j−1), 6+10·(j−1)}, and j=1, 2, ..., (T/10) may be given based on the periodicity T.

In a case where the configuration index is a fourth value, the periodicity T is a second periodicity, the offset k may be {0+10·(j−1), 1+10·(j−1), 5+10·(j−1), 6+10·(j−1)}.

In a case where the configuration index is the third value or the fourth value, the valid duration may be the subframes {(m+1)·T, (m+1)·T+1, ..., (m+2)·T−1}. The periodicity T may be an integral multiple of 10.

In a case where the DCI format 5 is detected on the subframes {m·T, m·T+1, ..., (m+1)·T−1}, the reception unit 105 may monitor a second DCI format (the downlink assignment and/or the uplink grant) to which the CRC parity bit that is scrambled by the C-RNTI is attached, based on the second UL-DL configuration during the valid duration.

In a case where the DCI format 5 is not detected on the subframes {m·T, m·T+1, ..., (m+1)·T−1}, the reception unit 105 may monitor a second DCI format (the downlink assignment and/or the uplink grant) to which the CRC parity bit that is scrambled by the C-RNTI is attached, based on the first UL-DL configuration during the valid duration.

Furthermore, a terminal device according to the present embodiment includes a configuration unit that sets a first UL-DL configuration based on a first signal of a higher layer, and that sets an index that corresponds to a periodicity T and an offset k, based on a second signal of the higher layer, and a reception unit that monitors a DCI format 5 on a subframe that satisfies (10·$n_f$+n−k) mod T=0, on a common search space of a primary cell, in which the $n_f$ may be a radio frame index (SFN), the n may be a subframe index within a radio frame, the DCI format 5 may include information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format 5 that is detected on certain subframes {m·T, m·T+1, ..., (m+1)·T−1}, may be the same.

Furthermore, a terminal device according to the present embodiment includes a configuration unit that sets an index which corresponds to a periodicity $T_i$ and an offset for each cell group i that is constituted from at least one or more serving cells, and a reception unit that monitors a DCI format 5 on a subframe which satisfies (10·$n_f$+n−$k_i$) mod T=0, in one serving cell among at least one or more serving cells that constitute the cell group, in which the $n_f$ may be a radio frame index (SFN), the n may be a subframe index within a radio frame, the DCI format 5 that is transmitted in a certain cell group may include information indicating a UL-DL configuration for each of at least one or more serving cells that constitute the same cell group as the certain cell group, and valid durations of at least one or more UL-DL configurations that are indicated by pieces of information, respectively, which are indicated by at least one or more of the UL-DL configurations that are included in the DCI format 5 which is detected on subframes {m·$T_i$, m·$T_i$+1, ..., (m+1)·$T_i$−1} in the cell group i may be the same.

More specifically, a base station apparatus 3 according to the present embodiment includes a configuration unit that sets a first UL-DL configuration for the terminal device through a first signal of a higher layer, and that sets a configuration index that corresponds to a periodicity T and an offset k, for the terminal device, through a second signal of the higher layer, and a transmission unit that transmits a DCI format 5 which includes information indicating a second UL-DL configuration, on a subframe that satisfies (10·$n_f$+n−k) mod T=0, to the terminal device, in which the $n_f$ may be a radio frame index (SFN), the n may be a subframe index within a radio frame, a valid duration of the second UL-DL configuration that is indicated by the information indicating the second UL-DL configuration which is included in the DCI format 5 that is transmitted on subframes {m·T, m·T+1, ..., (m+1)·T−1} may be the subframes {m·T, m·T+1, (m+1)·T−1} or subframes {(m+1)·T, (m+1)·T+1, ..., (m+2)·T−1}, the valid duration may be the subframes {m·T, m·T+1, ..., (m+1)·T−1} in a case where the configuration index is a first value, and the valid duration may be the subframes {(m+1)·T, (m+1)·T+1, ..., (m+2)·T−1} in a case where the configuration index is a second value.

In a case where the DCI format 5 is transmitted on the subframes {m·T, m·T+1, ..., (m+1)·T−1}, the transmission unit 307 may transmit a second DCI format (the downlink assignment and/or the uplink grant) to which the CRC parity bit that is scrambled by the C-RNTI is attached, based on the second UL-DL configuration during the valid duration.

In a case where the DCI format 5 is not transmitted on the subframes {m·T, m·T+1, ..., (m+1)·T−1}, the transmission unit 307 may transmit the second DCI format (the downlink assignment and/or the uplink grant) to which the CRC parity bit that is scrambled by the C-RNTI is attached, based on the first UL-DL configuration during the valid duration.

Furthermore, a base station apparatus according to the present embodiment includes a configuration unit that sets a first UL-DL configuration for the terminal device through a first signal of a higher layer, and that sets an index that corresponds to a periodicity T and an offset k, for the terminal device through a second signal of the higher layer, and a transmission unit that transmits a DCI format 5 on a subframe that satisfies (10·$n_f$+n−k) mod T=0, on a common search space of a primary cell, to the terminal device in which the $n_f$ may be a radio frame index (SFN), the n may be a subframe index within a radio frame, the DCI format 5 may include information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format 5 that is transmitted on certain subframes {m·T, m·T+1, ..., (m+1)·T−1}, may be the same.

Furthermore, a base station apparatus according to the present embodiment includes a configuration unit that sets an index which corresponds to a periodicity $T_i$ and an offset $k_i$, for each cell group i that is constituted from at least one or more serving cells, for the terminal device, and a transmission unit that transmits a DCI format 5 on a subframe which satisfies (10·$n_f$+n−$k_i$) mod T=0, in one serving cell among at least one or more serving cell that constitute the cell group, in which the $n_f$ is a radio frame index (SFN), the n is a subframe index within a radio frame, the DCI format 5 that is transmitted in a certain cell group includes information indicating a UL-DL configuration for each of at least one or more serving cells that constitute the same cell group as the certain cell group, and valid durations of at least one or more UL-DL configurations that are indicated by pieces of information, respectively, which are indicated by at least one or more of the UL-DL configurations that are included in the DCI format 5 which is detected on subframes {m·$T_i$, m·$T_i$+1, ... , (m+1)·$T_i$−1} in the cell group i are the same.

Accordingly, the terminal device can efficiently communicate with the base station apparatus.

Furthermore, the invention in the present application can be expressed as follows.

(1) A terminal device according to the present invention, which communicates with a base station apparatus, includes a configuration unit that sets a first UL-DL configuration based on a signal of a higher layer, and that sets an index that corresponds to a periodicity T and an offset k, based on the signal of the higher layer, and a reception unit that monitors a DCI format on a subframe that satisfies (10·$n_f$+n−k) mod T=0, on a common search space of a primary cell, in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is detected on certain subframes {m·T, m·T+1, ... , (m+1)·T−1}, are the same.

(2) Furthermore, a base station apparatus according to the present invention, which communicates with a terminal device, includes a configuration unit that sets a UL-DL configuration for the terminal device through a signal of a higher layer, and that sets an index that corresponds to a periodicity T and an offset k, for the terminal device through the signal of the higher layer, and a transmission unit that transmits a DCI format on a subframe that satisfies (10·$n_f$+n−k) mod T=0, on a common search space of a primary cell, to the terminal device in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is transmitted on certain subframes {m·T, m·T+1, ... , (m+1)·T−1}, are the same.

(3) Furthermore, a communication method according to the present invention, which is for use in a terminal device that communicates with a base station apparatus, includes setting a first UL-DL configuration based on a signal of a higher layer, and setting an index that corresponds to a periodicity T and an offset k, based on the signal of the higher layer, and monitoring a DCI format on a subframe that satisfies (10·$n_f$+n−k) mod T=0, on a common search space of a primary cell, in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is detected on certain subframes {m·T, m·T+1, ... , (m+1)·T−1}, are the same.

(4) Furthermore, a communication method according to the present invention, which is for use in a base station apparatus that communicates with a terminal device, includes setting a first UL-DL configuration for the terminal device through a signal of a higher layer, and setting an index that corresponds to a periodicity T and an offset k, for the terminal device through the signal of the higher layer, and transmitting a DCI format on a subframe that satisfies (10·$n_f$+n−k) mod T=0, on a common search space of a primary cell, to the terminal device in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is transmitted on certain subframes {m·T, m·T+1, ... , (m+1)·T−1}, are the same.

(5) Furthermore, an integrated circuit according to the present invention, which is mounted into a terminal device that communicates with a base station apparatus, causes the terminal device to perform a sequence of functions including a function of setting a first UL-DL configuration based on a signal of a higher layer, a function of setting an index that corresponds to a periodicity T and an offset k, based on the signal of the higher layer, and a function of monitoring a DCI format on a subframe that satisfies (10·$n_f$+n−k) mod T=0, on a common search space of a primary cell, in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is detected on certain subframes {m·T, m·T+1, ... , (m+1)·T−1}, are the same.

(6) Furthermore, an integrated circuit according to the present invention, which is mounted into a base station apparatus that communicates with a terminal device, causes the terminal device to perform a sequence of functions including a function of setting a first UL-DL configuration for the terminal device through a signal of a higher layer, a function of setting an index that corresponds to a periodicity T and an offset k, for the terminal device through the signal of the higher layer, and a function of transmitting a DCI format on a subframe that satisfies (10·$n_f$+n−k) mod T=0, on a common search space of a primary cell, to the terminal device in which the $n_f$ is a radio frame index (SFN), the n is a subframe index within a radio frame, the DCI format includes information indicating a second UL-DL configuration for the primary cell and information indicating a second UL-DL configuration for a secondary cell, and valid durations of the two second UL-DL configurations, which are indicated by the information indicating the second UL-DL configuration for the primary cell and the information indicating the second UL-DL configuration for the secondary cell, respectively, which are included in the DCI format that is transmitted on certain subframes $\{m \cdot T, m \cdot T+1, \ldots, (m+1) \cdot T-1\}$, are the same.

(7) Furthermore, a terminal device according to the present invention, which communicates with a base station apparatus, includes a configuration unit that sets an index which corresponds to a periodicity $T_i$ and an offset $k_i$, for each cell group i that is constituted from at least one or more serving cells, and a reception unit that monitors a DCI format on a subframe which satisfies $(10 \cdot n_f + n - k_i) \mod T=0$, in one serving cell among at least one or more serving cells that constitute the cell group, in which the $n_f$ is a radio frame index (SFN), the n is a subframe index within a radio frame, the DCI format that is transmitted in a certain cell group includes information indicating a UL-DL configuration for each of at least one or more serving cells that constitute the same cell group as the certain cell group, and valid durations of at least one or more UL-DL configurations that are indicated by pieces of information, respectively, which are indicated by at least one or more of the UL-DL configurations that are included in the DCI format which is detected on subframes $\{m \cdot T_i, m \cdot T_i+1, \ldots, (m+1) \cdot T_i-1\}$ in the cell group i are the same.

(8) Furthermore, a base station apparatus according to the present invention, which communicates with a terminal device, includes a configuration unit that sets an index which corresponds to a periodicity $T_i$ and an offset $k_i$ for each cell group i that is constituted from at least one or more serving cells, for the terminal device, and a transmission unit that transmits a DCI format on a subframe which satisfies $(10 \cdot n_f + n - k_i) \mod T=0$, in one serving cell among at least one or more serving cells that constitute the cell group, in which the $n_f$ is a radio frame index (SFN), the n is a subframe index within a radio frame, the DCI format that is transmitted in a certain cell group includes information indicating a UL-DL configuration for each of at least one or more serving cells that constitute the same cell group as the certain cell group, and valid durations of at least one or more UL-DL configurations that are indicated by pieces of information, respectively, which are indicated by at least one or more of the UL-DL configurations that are included in the DCI format which is detected on subframes $\{m \cdot T_i, m \cdot T_i+1, \ldots, (m+1) \cdot T_i-1\}$ in the cell group i are the same.

A program running on the base station apparatus 3 and the terminal device 1 according to the present invention may be a program (a program for causing a computer to operate) that controls a Central Processing Unit (CPU) and the like in such a manner as to realize the function according to the embodiments of the present invention, which are described above. Then, pieces of information that are handled in these apparatus are temporarily stored in a Random Access Memory (RAM) while being processed.

Thereafter, the pieces of information are stored in various types of ROMs such as a Flash Read Only Memory (ROM), or a Hard Disk Drive (HDD) and, whenever necessary, are read by the CPU to be modified or rewritten.

Moreover, one portion of each of the terminal device 1 and the base station apparatus 3 according to the embodiments, which are described above, may be realized by the computer. In that case, this one portion may be realized by recording a program for realizing such a control function on a computer-readable medium and causing a computer system to read the program stored on the recording medium for execution.

Moreover, the "computer system" here is defined as a computer system that is built into the terminal device 1 or the base station apparatus 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit, and a medium that retains the program for a fixed period of time, such as a volatile memory within the computer system, which functions as a server or a client in a case of retaining the program dynamically. Furthermore, the program described above may be one for realizing some of the functions described above and additionally may be one that can realize the functions described above in combination with a program that is already recorded on the computer system.

Furthermore, the base station apparatus 3 according to the embodiments, which are described above, can be realized as an aggregation (an apparatus group) that is configured from multiple apparatuses. Each of the apparatuses that constitute the apparatus group may be equipped with some portions or all portions of each function, or some portions or all portions of each functional block of the base station apparatus 3 according to the embodiments, which are described. The apparatus group itself may have each general function or each general functional block of the base station apparatus 3. Furthermore, the terminal device 1 according to the embodiments, which are described, can also communicate with the base station apparatuses as the aggregation.

Furthermore, the base station apparatus 3 according to the embodiments, which are described, may also be referred to as an Evolved Universal Terrestrial Radio Access Network (E-UTRAN). Furthermore, the base station apparatus 3 according to the embodiments, which are described, may have some portions or all portions of a function of a node that is at a higher level than an eNodeB.

Furthermore, some portions or all portions of each of the terminal device 1 and the base station apparatus 3 according to the embodiments, which are described, may be realized as an LSI that is a typical integrated circuit and may be realized as a chip set. Each functional block of the terminal device 1 and the base station apparatus 3 may be individually realized into a chip, and some of, or all of the functional blocks may be integrated into a chip. Furthermore, a technique for circuit integration is not limited to the LSI, and the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, according to the embodiments, which are described above, the terminal device is described as one example of a communication device, but the present invention is not limited to this, and can also be applied to a terminal device or a communication device, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and also includes an amendment to a design and the like that fall within the scope that does not depart from the gist of the present invention. Furthermore, various modifications are possible within the scope of the present invention defined by claims, and embodiments that are made by suitably combining technical means that are disclosed according to the different embodiments are also included in the technical scope of the present invention. Furthermore, a configuration in which a constituent element that achieves the same effect is substituted for the one that is described according to each of the embodiments described above is also included in the technical scope of the present invention.

REFERENCE SIGNS LIST 1 (1A, 1B, 1C) TERMINAL DEVICE
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
3011 RADIO RESOURCE CONTROL UNIT
3013 SCHEDULING UNIT

The invention claimed is:

1. A terminal apparatus that is configured to communicate with a base station apparatus by using a plurality of cells, comprising:
    reception circuitry configured to
        receive a higher layer signal at least indicating a Radio Network Temporary Identifier (RNTI), periodicity to monitor a Physical Downlink Control Channel (PDCCH) with the RNTI, and subframes within the periodicity to monitor the PDCCH with the RNTI, and
        receive, for each of the plurality of cells, an index which indicates one of M pieces of information, each of the M pieces of information indicating an uplink-downlink configuration, and
    control circuitry configured to configure the subframes to monitor the PDCCH with the RNTI based on at least the received higher layer signal, wherein
    the reception circuitry is configured to monitor, in the configured subframes, the PDCCH with the RNTI in a common search space on a predetermined cell which is one of the plurality of cells, and to receive the M pieces of information included in the PDCCH with the RNTI, and
    the control circuitry is configured to determine, for each of the plurality of cells, the uplink-downlink configuration from the M pieces of information based on the index.

2. A base station apparatus that is configured to communicate with a terminal apparatus by using a plurality of cells, comprising:
    transmission circuitry configured to
        transmit a higher layer signal at least indicating a Radio Network Temporary Identifier(RNTI), periodicity to transmit a Physical Downlink Control channel (PDCCH) with the RNTI, and subframes within the periodicity to transmit the PDCCH with the RNTI, and
        transmit, for each of the plurality of cells, an index which indicates one of M pieces of information, each of the M pieces of information indicating an uplink-downlink configuration, and
    control circuitry configured to configure the subframes to transmit the PDCCH with the RNTI based on at least the higher layer signal, wherein
    the transmission circuitry is configured to transmit, in the configured subframes, the PDCCH with the RNTI in a common search space on a predetermined cell which is one of the plurality of cells, the PDCCH with the RNTI including at least the M pieces of information.

3. A communication method used in a terminal apparatus that is configured to communicate with a base station apparatus by using a plurality of cells, the communication method comprising:
    receiving a higher layer signal at least indicating a Radio Network Temporary Identifier (RNTI), periodicity to monitor a Physical Downlink Control Channel (PDCCH) with the RNTI, and subframes within the periodicity to monitor the PDCCH with the RNTI,
    receiving, for each of the plurality of cells, an index which indicates one of M pieces of information, each of the M pieces of information indicating an uplink-downlink configuration,
    configuring the subframes to monitor the PDCCH with the RNTI based on at least the received higher layer signal,
    monitoring, in the configured subframes, the PDCCH with the RNTI in a common search space on a predetermined cell which is one of the plurality of cells,
    receiving the M pieces of information included in the PDCCH with the RNTI, and
    determining, for each of the plurality of cells, the uplink-downlink configuration from the M pieces of information based on the index.

4. A communication method used in a base station apparatus that is configured to communicate with a terminal apparatus by using a plurality of cells, the communication method comprising:
    transmitting a higher layer signal at least indicating a Radio Network Temporary Identifier (RNTI), periodicity to transmit a Physical Downlink Control CHannel (PDCCH) with the RNTI, and subframes within the periodicity to transmit the PDCCH with the RNTI,
    transmitting, for each of the plurality of cells, an index which indicates one of M pieces of information, each of the M pieces of information indicating an uplink-downlink configuration, and
    configuring the subframes to transmit the PDCCH with the RNTI based on at least the higher layer signal, and
    transmitting, in the configured subframes, the PDCCH with the RNTI in a common search space on a predetermined cell which is one of the plurality of cells, the PDCCH with the RNTI including at least the M pieces of information.

* * * * *